US011657408B2

(12) United States Patent
Kurian et al.

(10) Patent No.: US 11,657,408 B2
(45) Date of Patent: May 23, 2023

(54) SYNCHRONOUSLY TRACKING AND CONTROLLING EVENTS ACROSS MULTIPLE COMPUTER SYSTEMS

(71) Applicant: Bank of America Corporation, Charlotte, NC (US)

(72) Inventors: Manu Kurian, Dallas, TX (US); Matthew E. Carroll, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 236 days.

(21) Appl. No.: 16/736,159

(22) Filed: Jan. 7, 2020

(65) Prior Publication Data

US 2021/0209618 A1 Jul. 8, 2021

(51) Int. Cl.
*G06Q 30/0201* (2023.01)
*G06N 20/00* (2019.01)

(52) U.S. Cl.
CPC ......... *G06Q 30/0201* (2013.01); *G06N 20/00* (2019.01)

(58) Field of Classification Search
USPC ....................................... 705/7.29
See application file for complete search history.

(56) References Cited

U.S. PATENT DOCUMENTS

| 5,878,141 | A  | 3/1999  | Daly et al. |
| 6,185,545 | B1 | 2/2001  | Resnick et al. |
| 6,850,900 | B1 | 2/2005  | Hare et al. |
| 7,437,327 | B2 | 10/2008 | Lam et al. |
| 7,451,107 | B1 | 11/2008 | Chvala et al. |
| 7,895,122 | B2 | 2/2011  | Flitcroft et al. |
| 8,046,265 | B2 | 10/2011 | Van Luchene et al. |
| 8,244,625 | B2 | 8/2012  | Holm et al. |
| 8,412,625 | B2 | 4/2013  | Pilo' |
| 8,447,641 | B1 | 5/2013  | Kaza et al. |
| 8,484,129 | B2 | 7/2013  | Holm et al. |
| 8,543,497 | B1 | 9/2013  | Mohsenzadeh |
| 8,744,960 | B2 | 6/2014  | Lister |

(Continued)

OTHER PUBLICATIONS

Tao, Scalable and Vision Free User Interface Approaches for Indoor Navigation Systems for the Visually Impaired, Feb. 2015, University of Massachusetts Amherst (Year: 2015).*

*Primary Examiner* — Timothy Padot
*Assistant Examiner* — Allison M Robinson
(74) *Attorney, Agent, or Firm* — Banner & Witcoff, Ltd.

(57) ABSTRACT

Arrangements for synchronously tracking and controlling events across multiple computer systems are provided. In some examples, a user may register with a system and user data may be received. In some arrangements, historical data associated with the user may also be received. Machine learning may be used to analyze the historical data and/or user data and a first recommendation for an item may be generated and transmitted to the user. Upon receiving acceptance of the recommendation, the system may request data from one or more entities. For instance, entity data associated with current inventory, availability of items, layout of locations, and the like, may be received. Based on the received data, a list of items for capture and/or an item capture route may be generated. In some examples, the item capture route may include step-by-step or map-based instructions to capture the items on the list.

20 Claims, 18 Drawing Sheets

(56) References Cited

U.S. PATENT DOCUMENTS

| | | | |
|---|---|---|---|
| 9,747,621 B1 | 8/2017 | Kuruvila | |
| 9,824,349 B2 | 11/2017 | Xing et al. | |
| 2008/0024993 A1 | 1/2008 | Chu et al. | |
| 2010/0030675 A1 | 2/2010 | Hanan et al. | |
| 2013/0325481 A1* | 12/2013 | van Os | G01C 21/3629 704/E21.001 |
| 2014/0067597 A1* | 3/2014 | Kirkby | H04L 67/18 705/26.7 |
| 2014/0365113 A1* | 12/2014 | McGavran | G01C 21/3626 701/538 |
| 2015/0073907 A1* | 3/2015 | Purves | G06Q 20/384 705/14.58 |
| 2015/0112826 A1* | 4/2015 | Crutchfield, Jr. | G06Q 30/0643 705/26.1 |
| 2017/0364873 A1 | 12/2017 | Turk et al. | |
| 2018/0144326 A1 | 5/2018 | Finch et al. | |
| 2019/0034995 A1* | 1/2019 | Dong | G06Q 30/0281 |
| 2019/0186753 A1* | 6/2019 | Yeh | F24C 15/325 |

* cited by examiner

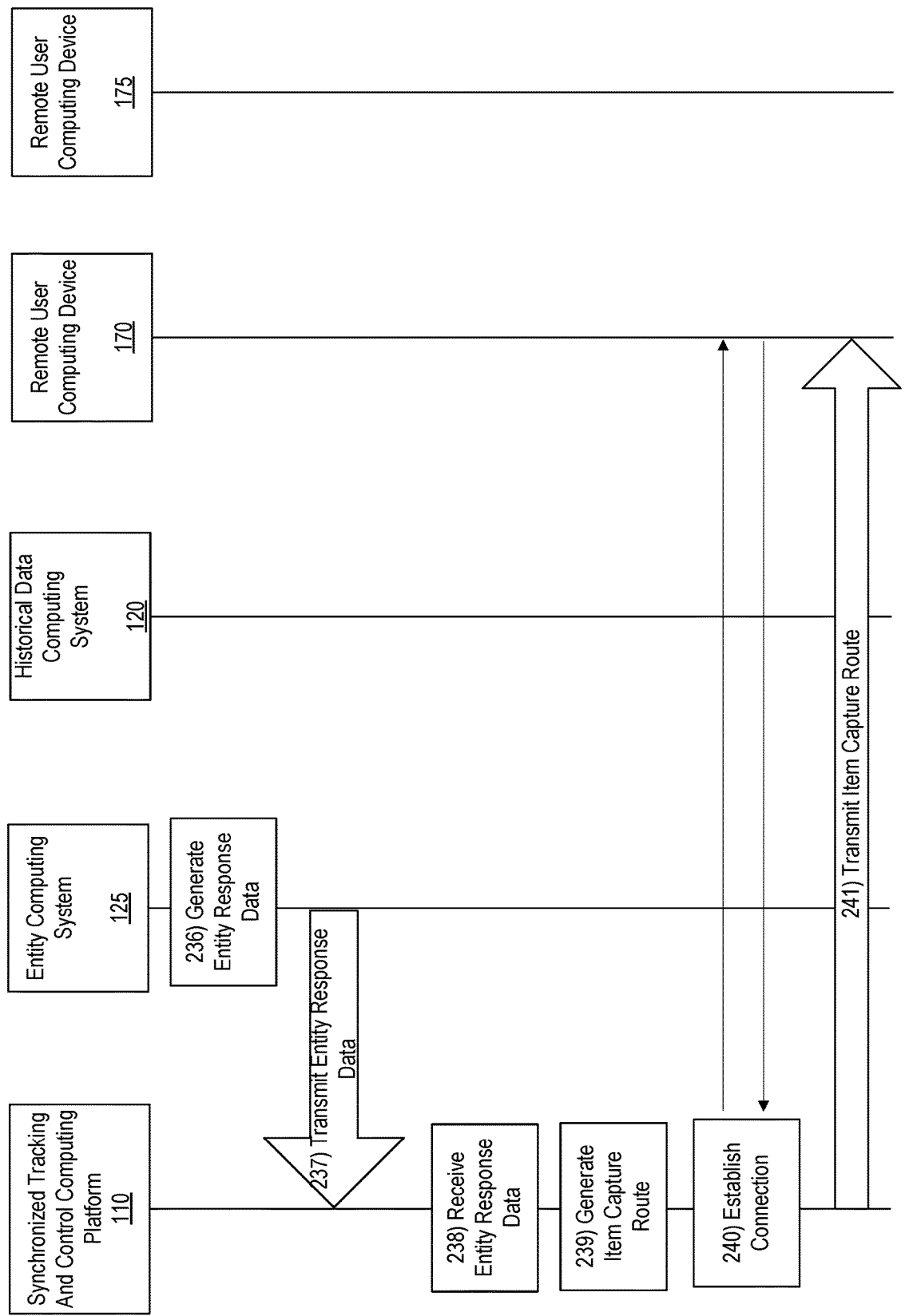

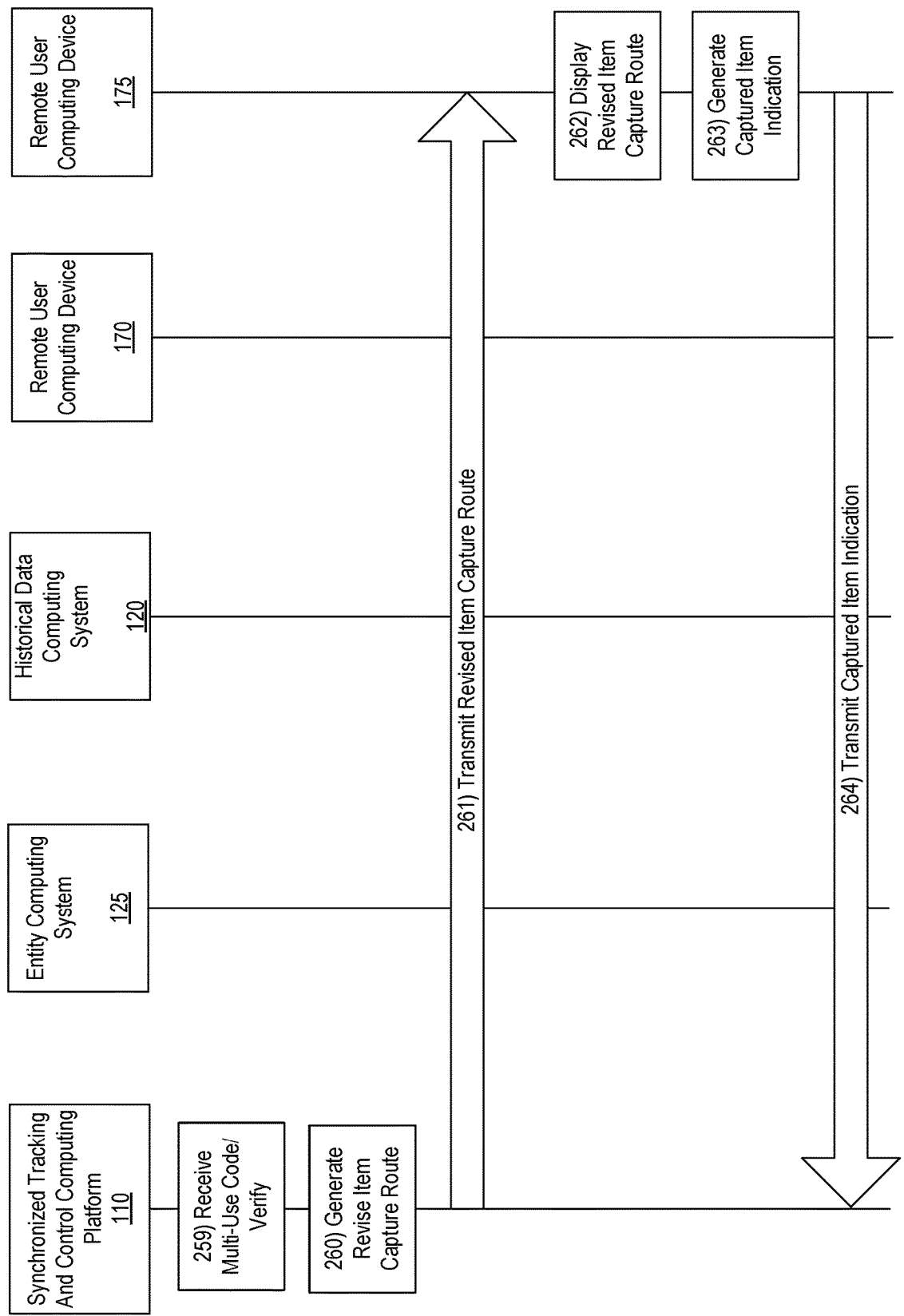

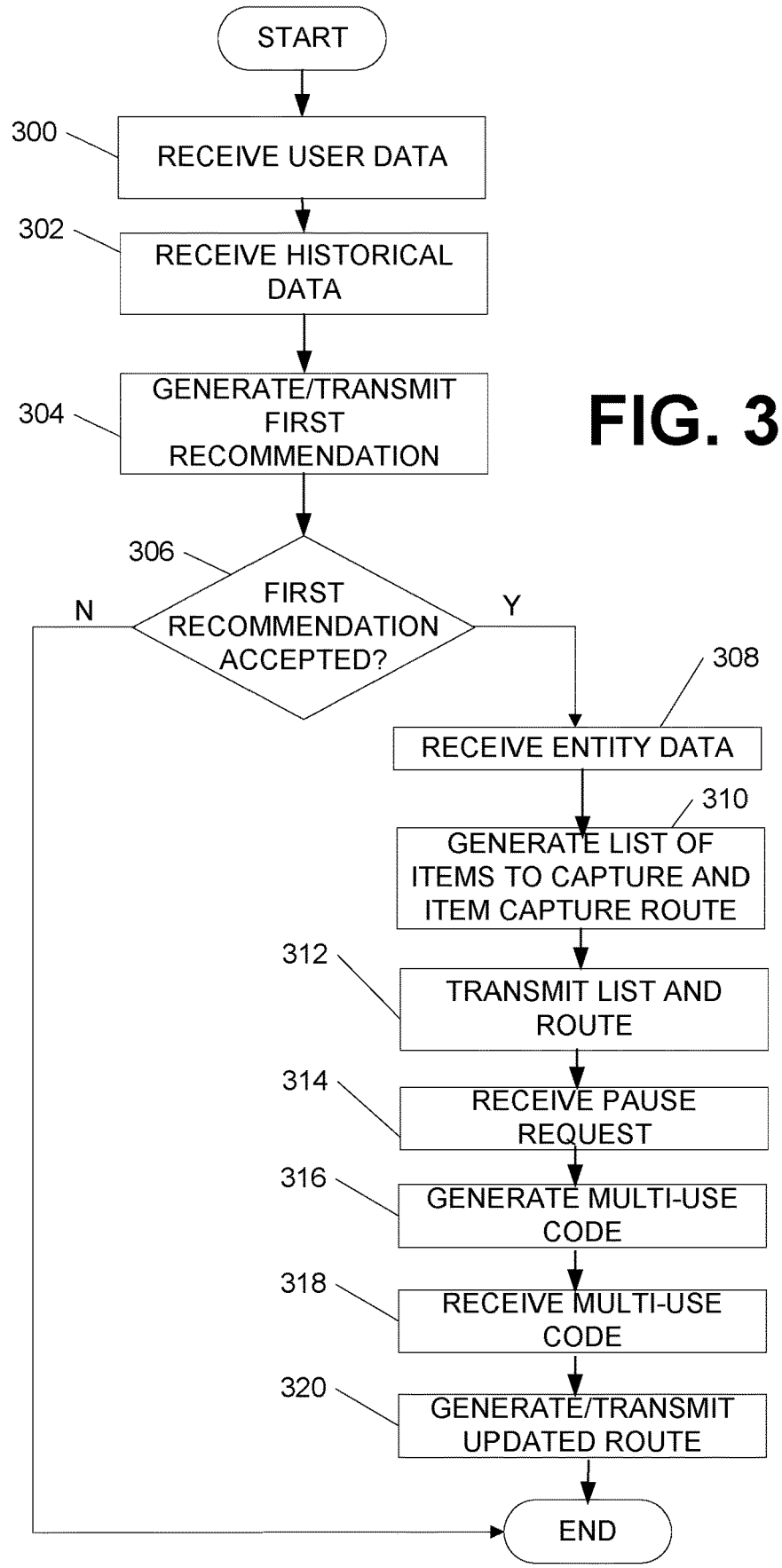

SYNCHRONOUSLY TRACKING AND CONTROLLING EVENTS ACROSS MULTIPLE COMPUTER SYSTEMS

BACKGROUND

Aspects of the disclosure relate to electrical computers, systems, and devices for synchronously tracking and controlling events across multiple computer systems Users often rely on computing devices, such as mobile computing devices, to simplify their lives. However, users often rely on more than one computing device (e.g., smartphone, tablet, laptop, and the like) to perform various functions throughout the day. In conventional systems, data captured via one device might not be transmitted to other devices or applications executing on those devices. Accordingly, inefficiencies exist in providing processes to aid a user in performing various functions. It would be advantageous to synchronously track and control events across multiple computer systems to provide a more efficient, complete, accurate view for a user.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with receiving and evaluating data captured across multiple computer systems.

In some examples, a user may register with a system and user data may be received according to permissions provided by the user. For instance, user data associated with a desired purchase, internet browsing history, location, or the like, may be received. In some arrangements, historical data associated with the user may also be received. In some examples, machine learning may be used to analyze the historical data and/or user data and a first recommendation for an item may be generated and transmitted to the user. Upon receiving acceptance of the recommendation, the system may request data from one or more entities. For instance, entity data associated with current inventory, availability of items, layout of locations, and the like, may be received.

Based on the received data, a list of items for capture and/or an item capture route may be generated. In some examples, the item capture route may include step-by-step or map-based instructions to capture the items on the list. In some examples, the route may be within a first entity locations. Additionally or alternatively, the route may be within a location, between different entity locations, and the like.

When the user has captured the desired items, an indication may be transmitted to the system and a cost (e.g., based on received entity data) for the captured items may be determined. In some examples, an event may be processed automatically for the items.

In some examples, a user may desire to pause the generated item capture route. Accordingly, a multi-use code may be generated and associated with the list and/or route. The code may be transmitted to a user device and, subsequently received from a user device to resume the generated (or updated) route.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2L depict an illustrative event sequence for implementing synchronous tracking and control functions in accordance with one or more aspects described herein;

FIG. 3 depicts an illustrative method for implementing and using synchronous tracking and control functions according to one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, efficiently using mobile devices to streamline user processes is beneficial. However, when a user relies on multiple computing devices to perform one or more processes, data analysis can become inefficient and inaccurate. Accordingly, it is advantageous to synchronize and control events across multiple computing systems.

As discussed herein, user data, historical data, and the like may be received. The data may be analyzed (e.g., using machine learning) to generate one or more recommendations. A user may accept or reject a recommendation and a list of items for a user to capture may be generated. In some examples, an item capture route may also be generated. The item capture route may include instructions (e.g., step-by-step, map-based, or the like) indicating an efficient process to capture items on the list. If a detour from the route is detected, an updated route may be generated and provided to the user.

In some examples, the arrangements described herein may automatically process payment for any items captured. Further, a user may request to pause a generated route and may resume the route at a later time by providing a generated multi-use code.

These and various other arrangements will be discussed more fully below.

Figure 1A:
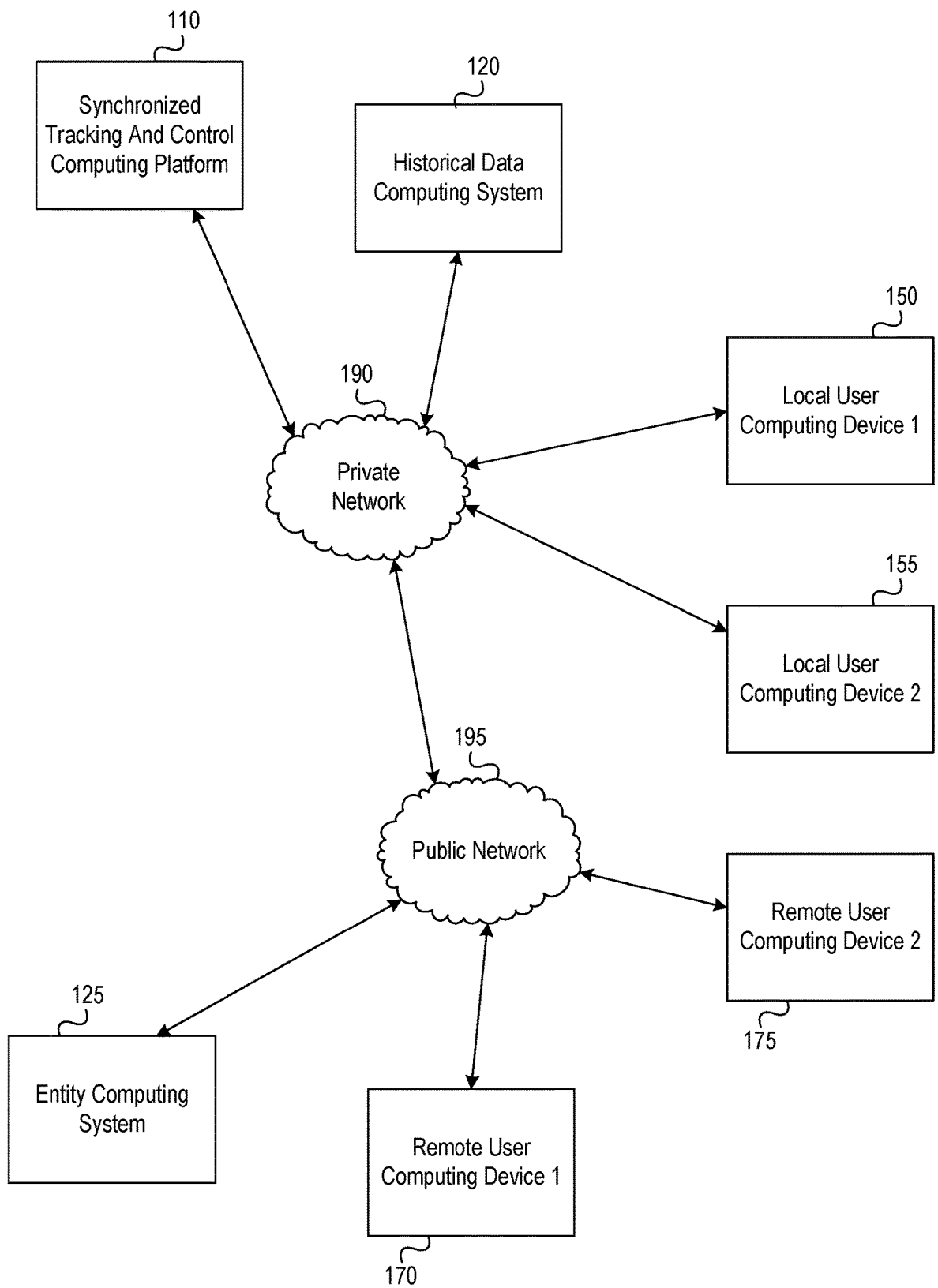
FIGS. 1A and 1B depict an illustrative computing environment for implementing synchronous tracking and control functions in accordance with one or more aspects described herein.
Figure 1B:
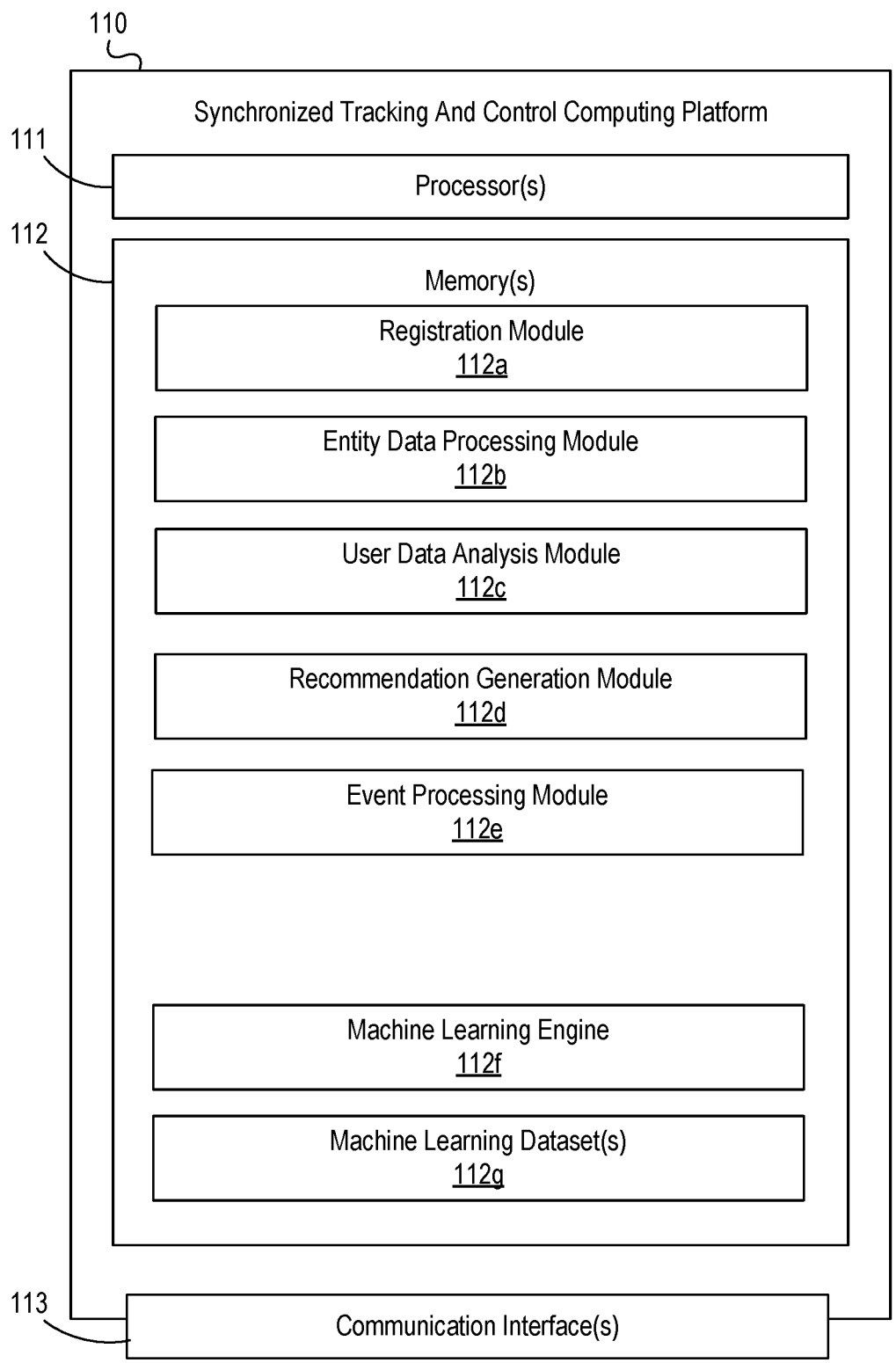

FIGS. 1A-1B depict an illustrative computing environment for implementing and using a system for synchronized tracking and control in accordance with one or more aspects described herein. Referring to FIG. 1A, computing environment 100 may include one or more computing devices and/or other computing systems. For example, computing environment 100 may include synchronized tracking and control computing platform 110, historical data computing system 120, entity computing system 125, a first local user computing device 150, a second local user computing device 155, a first remote user computing device 170, and a second remote user computing device 175. Although one entity computing device 125 is shown, two or more entity computing devices from two or more different entities may be used without departing from the invention.

Synchronized tracking and control computing platform 110 may be configured to provide intelligent, dynamic, analysis of user data to generate (e.g., in real-time or near real-time) user recommendation data, item capture route data, and the like. For instance, synchronized tracking and control computing platform 110 may receive, from a plurality of user devices, such as remote user computing device 170, remote user computing device 175, and the like, data associated with a user. In some examples, this data may be associated with internet browsing or online shopping habits, financial transaction or budget information, purchase history, and the like. This data may be processed, using machine learning, to generate one or more recommendations for a user. In some examples, data captured from a first user computing device, such as remote user computing device 170, may be used to generate one or more recommendations that may be transmitted for display on a second, different user computing device, such as remote user computing device 175. Accordingly, user activity may be synchronized to provide a more complete analysis of user data. User data is captured, analyzed, and the like with the permission of the user as provided during, for example, a registration process.

In some examples, one or more recommendations may be generated and retail or other entity data may be retrieved from one or more entity computing systems, such as entity computing system 125. Entity computing system 125 may include inventory/availability data associated with an entity or location of an entity, location layout data (e.g., location of items in aisles, on shelves, or the like), and the like. This data may be received by the synchronized tracking and control computing platform 110 and may be used to generate one or more recommended item capture routes for a user.

In some examples, real-time tracking of a user's progress along a generated item capture route may be captured by the synchronized tracking and control computing platform (e.g., via a remote user computing device 170, 175). Upon detection of a pause, break or detour from the generated route, the synchronized tracking and control computing platform 110 may re-generate a route to accommodate a detour, generate a multi-use code to resume the generated route at a later time, or the like.

Historical data computing system 120, and the like, may be a computing device or plurality of devices suitable for hosting and/or executing one or more applications configured to receive data associated with a plurality of users, store data, store linking data, and the like.

Entity computing system 125, and the like, may be a computing device or plurality of devices suitable for hosting and/or executing one or more processes configured to capture entity or entity location data (e.g., location coordinates of entity location, product inventory within each entity location, product layout of each entity location, and the like). The data may be stored and updated in real-time to ensure accuracy. Synchronized tracking and control computing platform 110 may retrieve entity and/or entity location data for analysis and/or recommendation generation.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access the synchronized tracking and control computing platform 110, historical data computing system 120, or the like to control parameters associated with the devices or systems, update or execute rules, modify settings and the like.

The remote user computing device 170 and remote user computing device 175 may be used to communicate with, for example, one or more systems, computing platforms, devices, or the like, to receive and display rendered item capture route data, receive items identified for purchase, process an event or transaction, provide real-time availability and/or mapping data, display and/or receive multi-use code data, and the like. Remote user computing devices 170, 175 may include user computing devices, such as mobile devices including smartphones, tablets, laptop computers, and the like, and/or desktop or other computing devices and/as discussed herein, data received from one remote user computing device 170 may be used to generate outputs, cause display of outputs, and the like on one or more other remote user computing devices, such as remote user computing device 175.

Computing environment 100 also may include one or more computing platforms. For example, and as noted above, computing environment 100 may include synchronized tracking and control computing platform 110. As illustrated in greater detail below, synchronized tracking and control computing platform 110 may include one or more computing devices configured to perform one or more of the functions described herein. For example, synchronized tracking and control computing platform 110 may include one or more computers (e.g., laptop computers, desktop computers, servers, server blades, or the like).

As mentioned above, computing environment 100 also may include one or more networks, which may interconnect one or more of synchronized tracking and control computing platform 110, historical data computing system 120, entity computing system 125, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, synchronized tracking and control computing platform 110, historical data computing system 120, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect synchronized tracking and control computing platform 110, historical data computing system 120, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., synchronized tracking and control computing platform 110, historical data computing system 120, local user computing device 150, local user computing device 155) with one or more networks and/or computing devices that are not associated with the organization. For example, entity computing system 125, remote user computing device 170, remote user computing device 175, might not be associated with an organization that operates private network 190 (e.g., because entity computing system 125, remote user computing device 170, remote user computing device 175, may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect entity computing system 125, remote user computing device 170, remote user computing device 175, to private network 190 and/or one or more computing devices connected thereto (e.g., synchronized tracking and control computing platform 110, historical data computing system 120, local user computing device 150, local user computing device 155).

Referring to FIG. 1B, synchronized tracking and control computing platform 110 may include one or more processors 111, memory 112, and communication interface 113. A data bus may interconnect processor(s) 111, memory 112, and communication interface 113. Communication interface 113 may be a network interface configured to support communication between synchronized tracking and control computing platform 110 and one or more networks (e.g., private network 190, public network 195, or the like). Memory 112 may include one or more program modules having instructions that when executed by processor(s) 111 cause synchronized tracking and control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of synchronized tracking and control computing platform 110 and/or by different computing devices that may form and/or otherwise make up synchronized tracking and control computing platform 110.

For example, memory 112 may have, store and/or include a registration module 112a. Registration module may store instructions and/or data that may cause or enable the synchronized tracking and control computing platform 110 to receive data related to one or more users registering with the system. In some examples, the registration information may include name, unique identifier, authentication information, one or more permissions to capture and analyze data, account information (e.g., for event processing), user device identifying information (international mobile equipment identity (IMEI), media access control (MAC) address, IP address, or the like), and the like.

In some examples, registration information may also be received from one or more entities. For example, an entity may request to register with the synchronized tracking and control computing platform 110. Accordingly, the entity may provide, via entity computing system 125, identifying information, computing device information, location data, permission data, and the like.

Synchronized tracking and control computing platform 110 may further have, store and/or include entity data processing module 112b. Entity data processing module 112b may store instructions and/or data that may cause or enable the synchronized tracking and control computing platform to connect (e.g., via one or more wireless or wired connections) to entity computing system 125, or the like, to retrieve current (e.g., real-time or near real-time) data related to inventory, availability of products, layout of locations, location of products within a location, and the like. This information may be analyzed, e.g., using machine learning, and used, in some examples, to generate recommendations for a user, generate item capture route data, display item capture route data, and the like.

Synchronized tracking and control computing platform 110 may further have, store and/or include user data analysis module 112c. User data analysis module 112c may store instructions and/or data that may cause or enable the synchronized tracking and control computing platform 110 to receive user data from, for example, user computing devices such as remote user computing device 170, remote user computing device 175, and/or other devices, such as historical data computing system 120. This data may include user purchase data, financial transactions, historical data, internet browsing history, and the like. The user data may be analyzed, using machine learning and, in some examples, may be used to generate one or more recommendations for a user.

Synchronized tracking and control computing platform 110 may further have, store and/or include a recommendation generation module 112d. Recommendation generation module 112d may store instructions and/or data that may cause or enable the synchronized tracking and control computing platform 110 to analyze data related to a user (e.g., from the user data analysis module 112c) and/or data from an entity (e.g., from entity data processing module 112b) using machine learning to generate one or more recommendations, item capture routes, or the like. For instance, based on historical data from a user, a shopping list may be generated. The shopping list may include recommendations for items that the system predicts the user may need (e.g., the user buys dish soap once per month and that time period is expiring so the system may add dish soap to the list).

In some examples, the recommendation generation module 112d may store further instructions and/or data that may cause or enable the synchronized tracking and control computing platform 110 to generate an item capture route for a user. The item capture route may include directions, maps, step-by-step instructions, or the like, instructing a user of an efficient route to take to capture all items desired (e.g., items on a list, errands to be run, etc.). The recommendations may be transmitted to one or more remote user computing devices, such as remote user computing device 170, remote user computing device 175, or the like, and displayed on a display of the computing device.

Synchronized tracking and control computing platform 110 may further have, store and/or include an event processing module 112e. Event processing module 112e may store instructions and/or data that may cause or enable the synchronized tracking and control computing platform 110 to process one or more events, such as transactions, and the like. For instance, upon receiving an indication that a user has captured one or more items (e.g., items from a list), the event processing module 112e may determine a total cost (e.g., based on pricing data received from an entity via entity data processing module 112b) and may cause an amount corresponding to the total cost to be charged to a user's credit card (e.g., based on credit card information provided by a user during registration), deducted from a bank account (e.g., based on account information received during a registration process), processed using a mobile payment application, and the like. In some examples, the event processing module 112e may generate a notification confirming that an event was processed (or indicating that an issue occurred with event processing) and the notification may be transmitted to a user computing device for display.

Synchronized tracking and control computing platform 110 may further have, store and/or include a machine learning engine 112f and machine learning datasets 112g. Machine learning engine 112f and machine learning datasets 112g may store instructions and/or data that may cause or enable synchronized tracking and control computing platform 110 to receive user data, entity data and/or historical data and analyze the data to generate one or more recommendations, an item capture route, or the like.

Machine learning engine 112f may identify patterns in the data to identify an appropriate recommendation, item capture route, or the like. The machine learning datasets 112g may be generated based on previously analyzed data (e.g., data from previously received data, historical data, and the like), raw data, and/or received from one or more outside sources.

The machine learning engine 112f may receive data related users, entities, and the like, and, using one or more machine learning algorithms, may generate and/or update or validate one or more machine learning datasets 112g. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112f may analyze data to identify patterns of activity, sequences of activity, and the like, to generate one or more machine learning datasets 112g.

Based on the generated machine learning datasets 112g, recommendation generation module 112d may identify one or more recommendations for a user to purchase, recommended item capture routes, and the like. The generated recommendations may be transmitted to a user computing device for display.

FIGS. 2A-2L depict one example illustrative event sequence for implementing and using synchronized tracking and control functions in accordance with one or more aspects described herein. The events shown in the illustrative event sequence are merely one example sequence and additional events may be added, or events may be omitted, without departing from the invention.

Figure 2A:
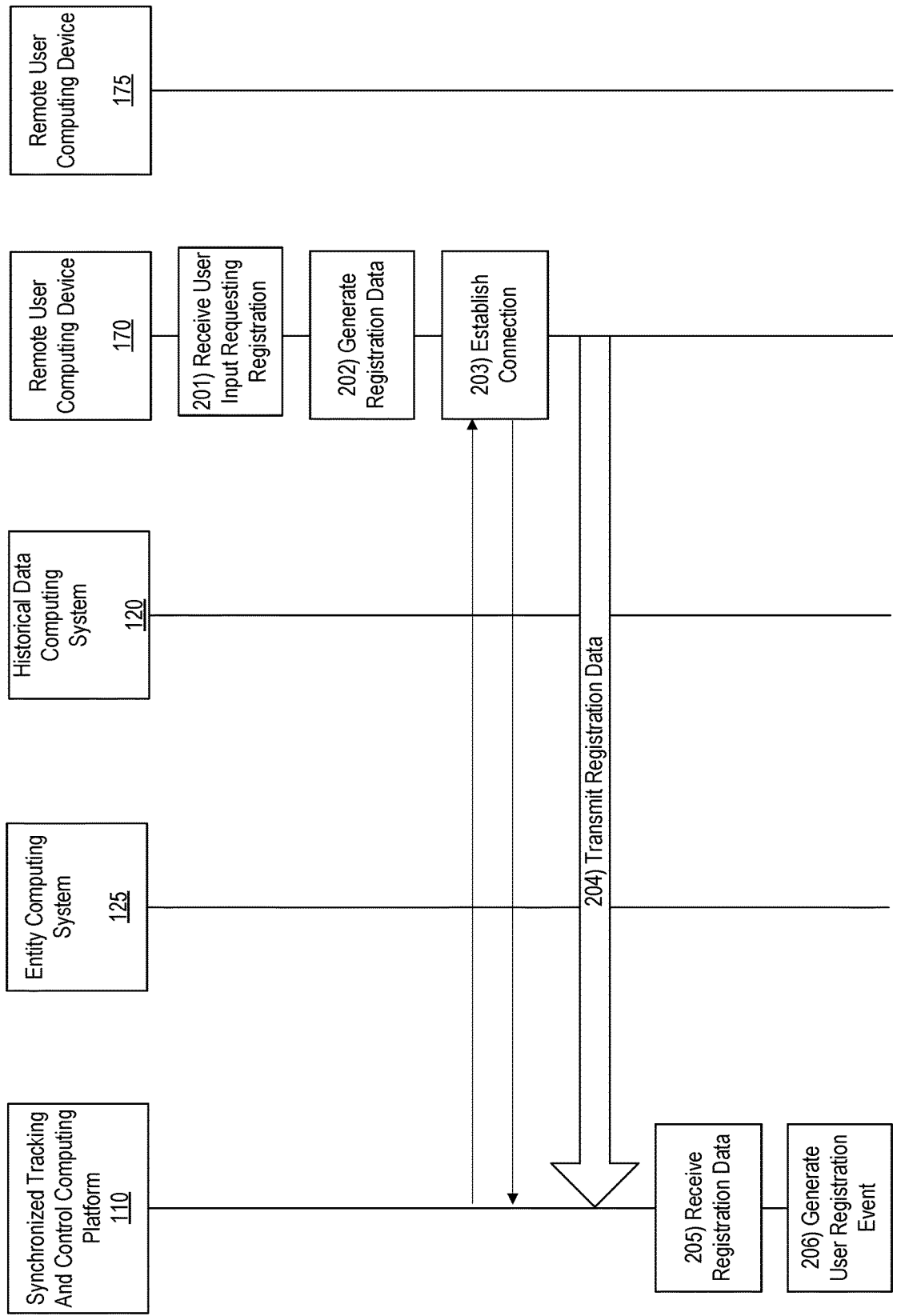

Referring to FIG. 2A, at step 201, user input requesting registration may be received. In some examples, the user input may be received by a remote user computing device, such as remote user computing device 170. In some arrangements, the user input may include registration information, such as name or unique identifier, permission data, account data, preference data, user device data (e.g., identifying data for one or more computing devices associated with a user, such as remote user computing device 170, remote user computing device 175, and the like). In some examples, the remote user computing device 170 may be a smartphone of a user while remote user computing device 175 may be a tablet of a user. In another example, remote user computing device 170 may be a smartphone of a first user and remote user computing device 175 may be a smartphone of a second user, different from the first user but associated with the first user such that the first user may register the device (e.g., spouse, parent, or the like). Various other remote user computing device arrangements may be used without departing from the invention.

At step 202, registration data may be generated. For instance, the user input received including the registration information may be used to generate registration data for the user.

At step 203, a connection may be established between the remote user computing device 170 and the synchronized tracking and control computing platform 110. For instance, a first wireless connection may be established between the synchronized tracking and control computing platform 110 and remote user computing device 170. Upon establishing the first wireless connection, a communication session may be initiated between synchronized tracking and control computing platform 110 and remote user computing device 170.

At step 204, the generated registration data may be transmitted from the remote user computing device 170 to the synchronized tracking and control computing platform 110. For instance, the generated registration data may be transmitted during the communication session initiated upon establishing the first wireless connection.

At step 205, the registration data may be received by the synchronized tracking and control computing platform 110. Responsive to receiving the registration data, a user registration event or entry may be generated at step 206. For instance, a new entry in a database may be generated and the user registration data may be stored.

Figure 2B:
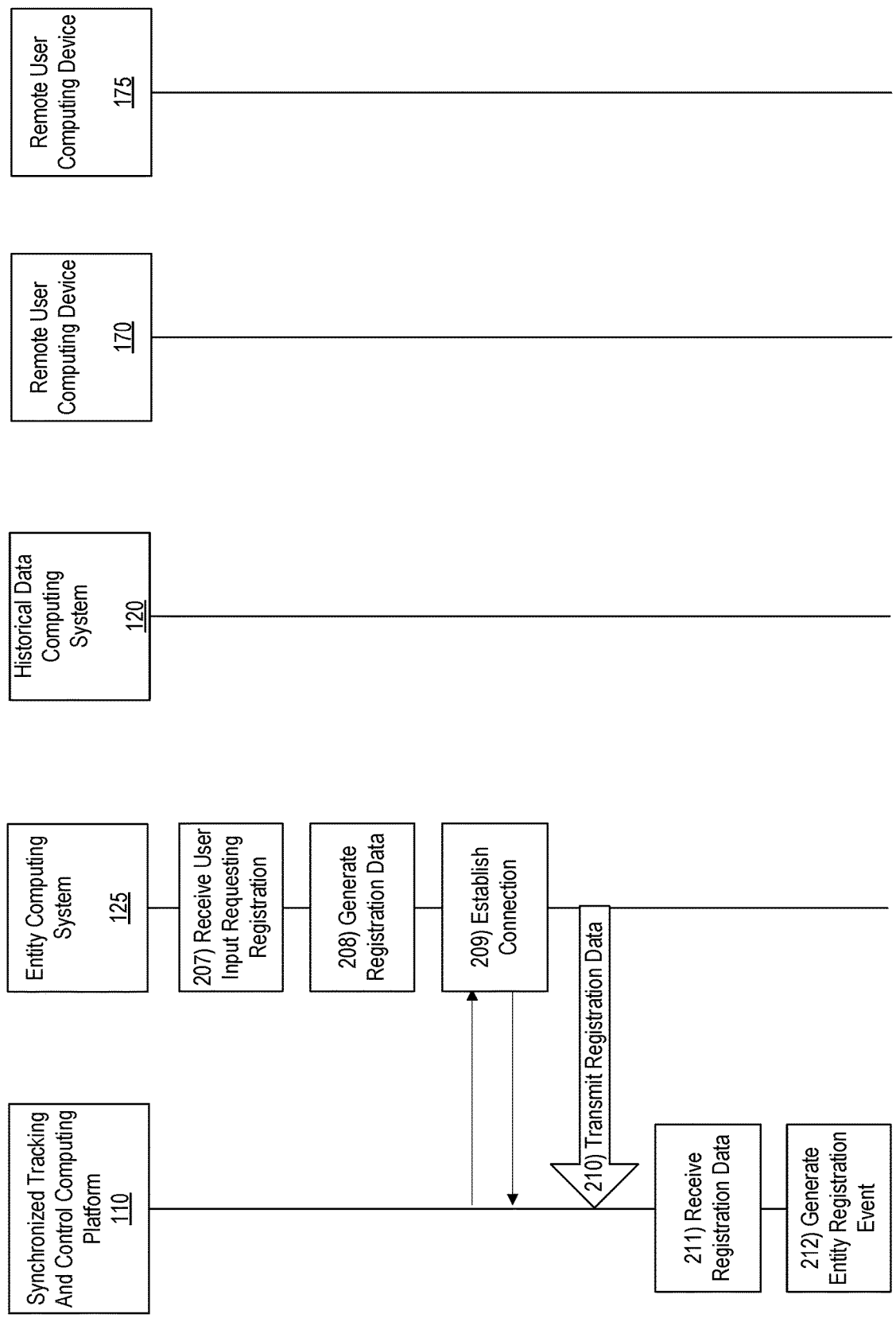

With reference to FIG. 2B, at step 207, user input requesting registration of one or more entities may be received. In some examples, the user input may be received by an entity computing system, such as entity computing system 125. Although one entity computing system is shown, two or more entity computing systems, from the same entity or from different entities, may be used and may request registration without departing from the invention.

In some arrangements, the user input may include registration information, such as name of the entity or unique identifier, permission data, account data, system or computing device data, entity location data (e.g., data by location if more than one location exists), inventory data or inventory system data, layout data, and the like.

At step 208, registration data may be generated. For instance, the user input received including the entity registration information may be used to generate registration data for the entity.

At step 209, a connection may be established between the entity computing system 125 and the synchronized tracking and control computing platform 110. For instance, a second wireless connection may be established between the synchronized tracking and control computing platform 110 and entity computing system 125. Upon establishing the second wireless connection, a communication session may be initiated between synchronized tracking and control computing platform 110 and entity computing system 125.

At step 210, the generated registration data may be transmitted from the entity computing system 125 to the synchronized tracking and control computing platform 110. For instance, the generated entity registration data may be transmitted during the communication session initiated upon establishing the second wireless connection.

At step 211, the entity registration data may be received by the synchronized tracking and control computing platform 110. Responsive to receiving the registration data, an entity registration event or entry may be generated at step 212. For instance, a new entry in a database may be generated and the entity registration data may be stored.

Figure 2C:
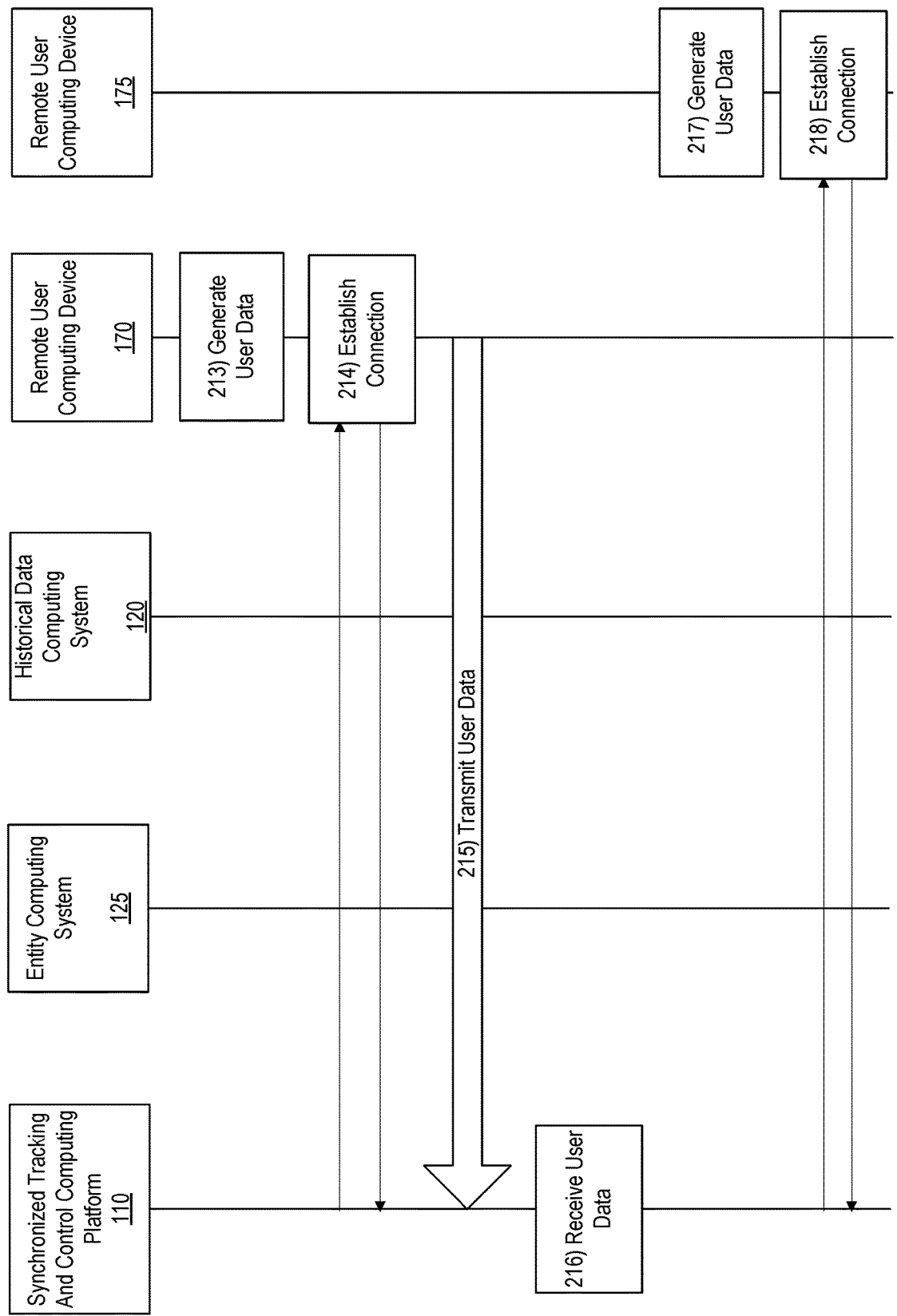

With reference to FIG. 2C, at step 213, user data may be generated. For instance, user data may be generated by one or more remote user computing devices, such as remote user computing device 170. The user data may include internet browsing history, purchase history, electronic shopping list data, or the like.

At step 214, a connection may be established between the remote user computing device 170 and the synchronized tracking and control computing platform 110. For instance, a third wireless connection may be established between the synchronized tracking and control computing platform 110 and remote user computing device 170. Upon establishing the third wireless connection, a communication session may be initiated between synchronized tracking and control computing platform 110 and remote user computing device 170.

At step 215, the generated user data may be transmitted from the remote user computing device 170 to synchronized tracking and control computing platform 110. For instance, the generated user data may be transmitted during the communication session established upon initiating the third wireless connection.

At step 216, the user data may be received by the synchronized tracking and control computing platform 110.

In some examples, user data may be generated by additional computing devices associated with the user (e.g., other registered computing devices). As shown in FIG. 2B, additional user data may be captured by another remote user computing device. However, in some examples, data may be captured by a single computing device without departing from the invention.

At step 217, user data may be generated. For instance, user data may be generated by one or more remote user computing devices, such as remote user computing device 175. The user data may include internet browsing history, purchase history, electronic shopping list data, or the like. In some examples, the user data generated via remote user computing device 175 may be different from the user data generated via remote user computing device 170. Additionally or alternatively, the data may be related (e.g., a user may browse for an item on remote user computing device 170 and may add it to an electronic list via remote user computing device 175. In another example, a user may begin an electronic shopping list on remote user computing device 175 and complete it via remote user computing device 170. Various other examples, may be used without departing from the invention.

At step 218, a connection may be established between the remote user computing device 175 and the synchronized tracking and control computing platform 110. For instance, a fourth wireless connection may be established between the synchronized tracking and control computing platform 110 and remote user computing device 175. Upon establishing the fourth wireless connection, a communication session may be initiated between synchronized tracking and control computing platform 110 and remote user computing device 175.

Figure 2D:
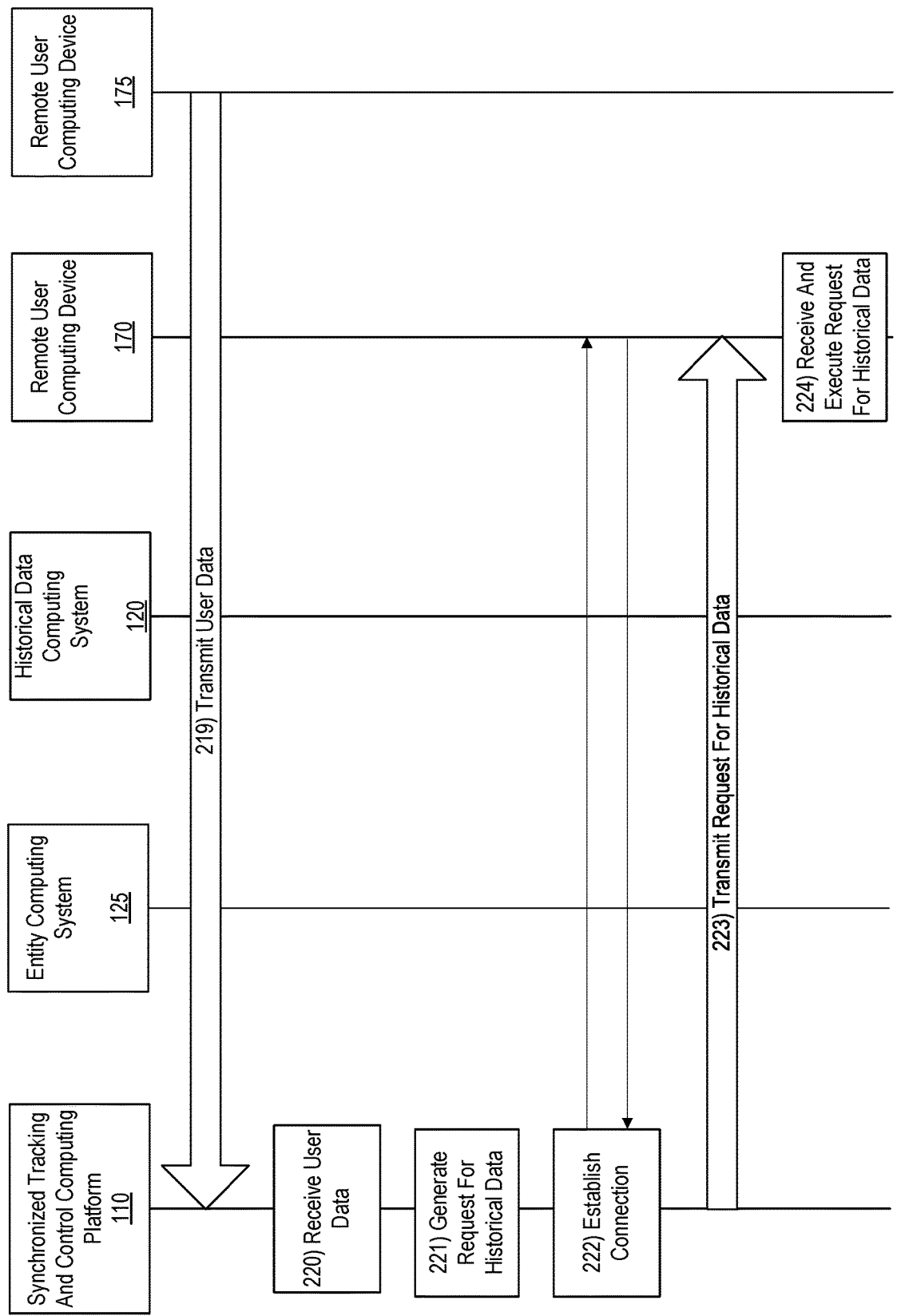

With reference to FIG. 2D, at step 219, the generated user data may be transmitted from the remote user computing device 175 to synchronized tracking and control computing platform 110. For instance, the generated user data may be transmitted during the communication session established upon initiating the fourth wireless connection.

At step 220, the user data may be received by the synchronized tracking and control computing platform 110.

At step 221, a request for historical data may be generated. For instance, the user data may be parsed to identify user identifying information (e.g., device identifying information, name or other unique identifier) and that may be used as input in a query to obtain historical data associated with the user. In some examples, the historical data request may include a request for purchase history, transaction or event processing history, internet browsing history, and the like.

At step 222, a connection may be established between the synchronized tracking and control computing platform 110 and the historical data computing system 120. For instance, a fifth wireless connection may be established between the synchronized tracking and control computing platform 110 and historical data computing system 120. Upon establishing the fifth wireless connection, a communication session may be initiated between synchronized tracking and control computing platform 110 and historical data computing system 120.

At step 223, the generated historical data request may be transmitted from the synchronized tracking and control computing platform 110 to the historical data computing system 120. For instance, the request for historical data may be transmitted during the communication session initiated upon establishing the fifth wireless connection.

At step 224, the request for historical data may be received by the historical data computing system 120 and executed. Executing the request may include retrieving the requested historical data.

Figure 2E:
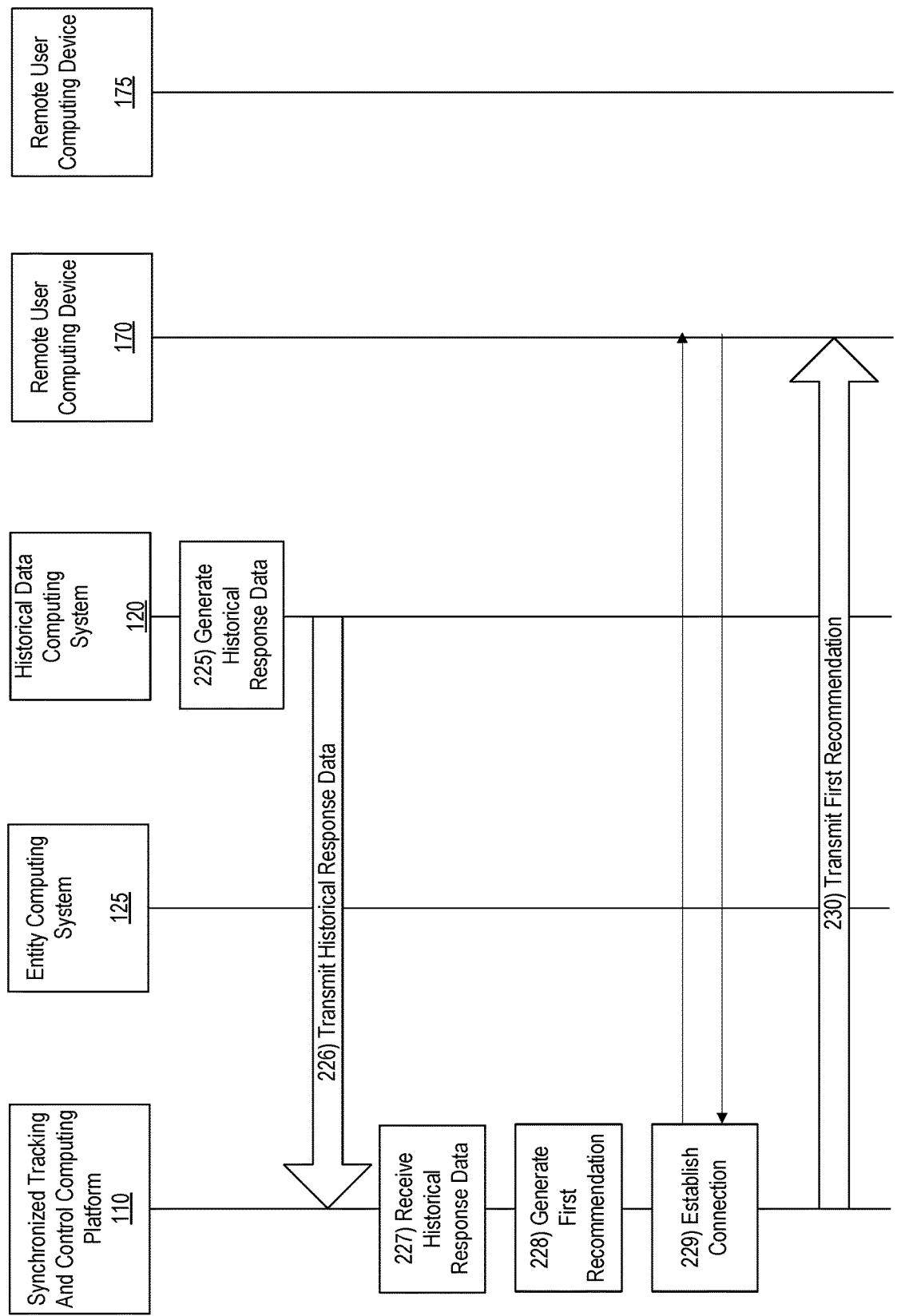

With reference to FIG. 2E, at step 225, historical response data may be generated. For instance, the historical data computing system 120 may generate historical response data based on the retrieved data.

At step 226, the historical response data may be transmitted from the historical data computing system 120 to the synchronized tracking and control computing platform 110. At step 227, the historical response data may be received by the synchronized tracking and control computing platform 110.

At step 228, the user data from remote user computing device 170, user data from remote user computing device 175, and/or historical response data may be analyzed (e.g., using machine learning) to generate a first recommendation. In some examples, the first recommendation may include a recommendation of an item for purchase. For instance, if a user was browsing the internet for an item, the first recommendation may include the item search by the user. In another example, the first recommendation may include one or more items for addition to a shopping list of the user. For instance, the synchronized tracking and control computing platform 110 may analyze historical purchase data to identify items that should be purchased (e.g., items likely to be in low supply with the user based on last purchase data, historical frequency of purchase, or the like). These items may be included in the first recommendation. Various other recommendations may be generated without departing from the invention.

In some examples, a notification or other user interface may be generated including the recommendation. In some arrangements, the user interface may include a request for user input accepting the recommendation or rejecting the recommendation. This user input may be used to generate user response data which may be transmitted to the synchronized tracking and control computing platform 110 to impact further recommendations for the user, update and/or validate machine learning datasets, or the like.

At step 229, a connection may be established between the synchronized tracking and control computing platform 110 and the remote user computing device 170. For instance, a sixth wireless connection may be established between the synchronized tracking and control computing platform 110 and remote user computing device 170. Upon establishing the sixth wireless connection, a communication session may be initiated between synchronized tracking and control computing platform 110 and remote user computing device 170.

Although a connection to remote user computing device 170 is shown, additionally or alternatively, a connection to remote user computing device 175 may be made without departing from the invention.

At step 230, the first recommendation may be transmitted from synchronized tracking and control computing platform 110 to the remote user computing device 170. For instance, the first recommendation may be transmitted during the communication session initiated upon establishing the sixth wireless connection.

Figure 2F:
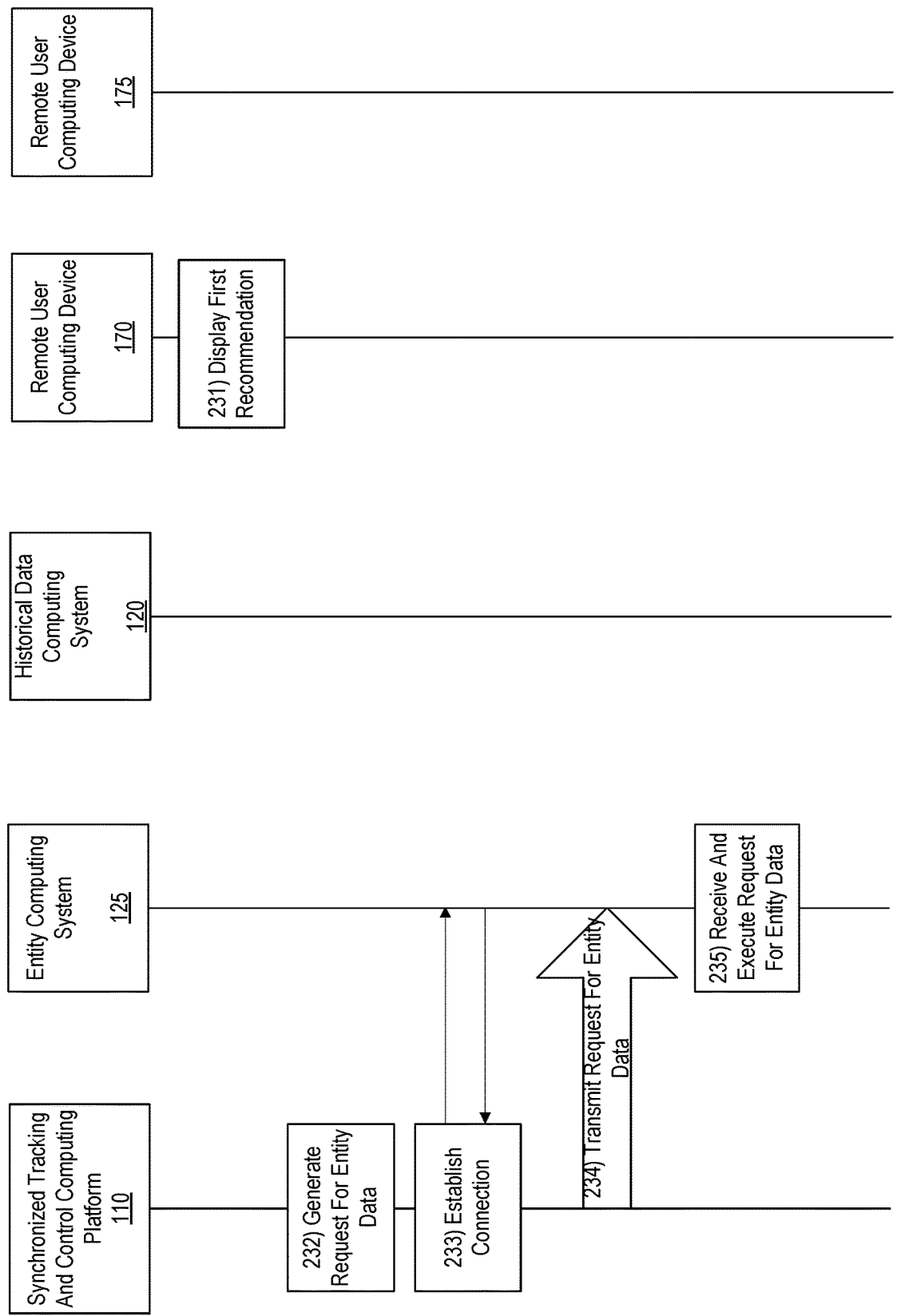

With reference to FIG. 2F, at step 231, the first recommendation may be displayed by a display of the remote user computing device 170. For instance, the generated notification or user interface may be displayed by the display of the remote user computing device. In some examples, display of the notification or user interface may include a request for user input which may then be transmitted to the synchronized tracking and control computing platform 110 and used in generation of subsequent recommendations.

At step 232, a request for entity data may be generated. For instance, based on the items designated (e.g., via the first recommendation, from an electronic shopping list of the user captured from the user data, or the like), one or more entities may be identified. In some examples, the entities may include retail establishments at which the user may purchase one or more of the items designated. After identifying the one or more entities, a request for entity data for each identified entity may be generated. In some examples, the requested data may include current or real-time inventory or availability data, hours of operation, location of items within an entity location, pricing information, and the like.

At step 233, a connection may be established between the synchronized tracking and control computing platform 110 and the entity computing system 125. For instance, a seventh wireless connection may be established between the synchronized tracking and control computing platform 110 and the entity computing system 125. Upon establishing the seventh wireless connection, a communication session may be initiated between synchronized tracking and control computing platform 110 and entity computing system 125.

At step 234, the request for entity data may be transmitted from the synchronized tracking and control computing platform 110 to the entity computing system 125. At step 235, the request for entity data may be received by the entity computing system 125 and executed. Executing the request for entity data may include capturing the requested data (e.g., inventory, pricing, and the like).

With reference to FIG. 2G, at step 236, entity response data may be generated. For instance, the captured or retrieved entity data may be used to generate entity response data. At step 237, the entity response data may be transmitted from the entity computing system 125 to the synchronized tracking and control computing platform 110.

At step 238, the entity response data may be received by the synchronized tracking and control computing platform 110 and may be analyzed by the synchronized tracking and control computing platform 110.

At step 239, the received entity data may be analyzed, e.g., using machine learning, to generate an item capture route. For instance, machine learning may be used to analyze the received entity response data, as well as the user data and/or first recommendation and generate a route that instructs the user on an efficient method or process for capturing items on, for example, the electronic shopping list, recommended items, or the like. In some examples, the generated item capture route may include a route through a particular retail entity location (e.g., item 1 is located in aisle 3 on the right side, then proceed to aisle 6 for items 2 and 3, and the like). Additionally or alternatively, if items on the list are located at more than one entity (e.g., at different physical locations), the generated item capture route may include a route through a particular entity location, as well as a route navigating the user from one entity to the next to capture all items on the list (or handle all items on the list). In some examples, the recommended item capture route may include step-by-step instructions. Additionally or alternatively, the item capture route may include a map view displaying a layout of the entity location (or map of roads between locations) and directions to follow via the map to obtain all items.

At step 240, a connection may be established between the synchronized tracking and control computing platform 110 and the remote user computing device 170. For instance, an eighth wireless connection may be established between the synchronized tracking and control computing platform 110 and the remote user computing device 170. Upon establishing the eighth wireless connection, a communication session may be initiated between synchronized tracking and control computing platform 110 and remote user computing device 170.

Although, in the example of FIG. 2G, the connection is made to remote user computing device 170, additionally or alternatively, a connection may be made to remote user computing device 175 and data may be transmitted thereto without departing from the invention.

At step 241, the generated item capture route may be transmitted from the synchronized tracking and control computing platform 110 to the remote user computing device 170. For instance, the item capture route may be transmitted during the communication session initiated upon establishing the eighth wireless connection.

Figure 2H:
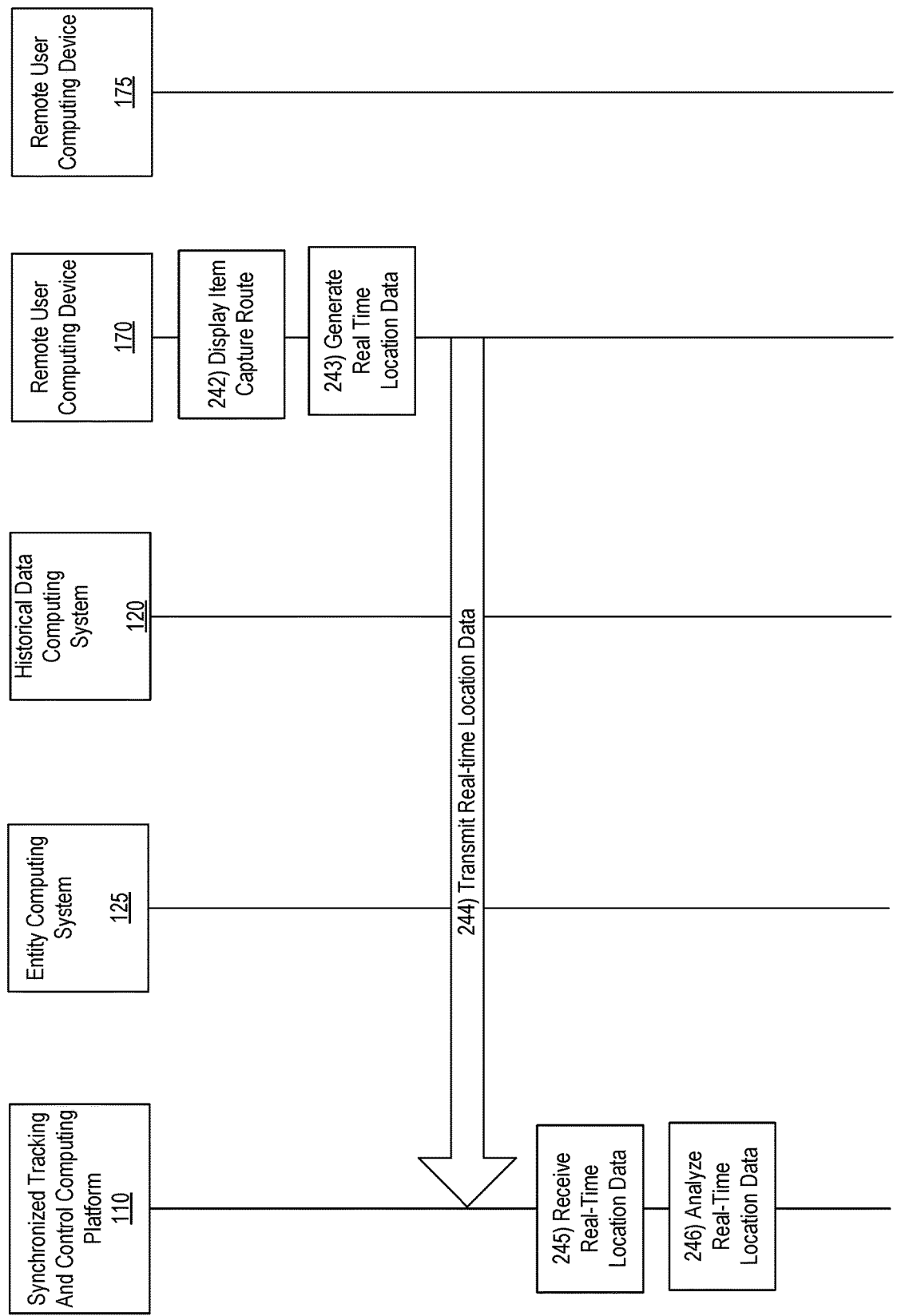

With reference to FIG. 2H, at step 242, the item capture route may be received by remote user computing device 170 and displayed by a display of remote user computing device 170.

At step 243, real-time location data of remote user computing device 170 may be generated or captured. For instance, global positioning system data for a current location of the remote user computing device 170 may be captured and, at step 244, transmitted to the synchronized tracking and control computing platform 110.

At step 245, the real-time location data may be received by the synchronized tracking and control computing platform 110 and, at step 246, the real-time location data may be analyzed by synchronized tracking and control computing platform 110.

Figure 2I:
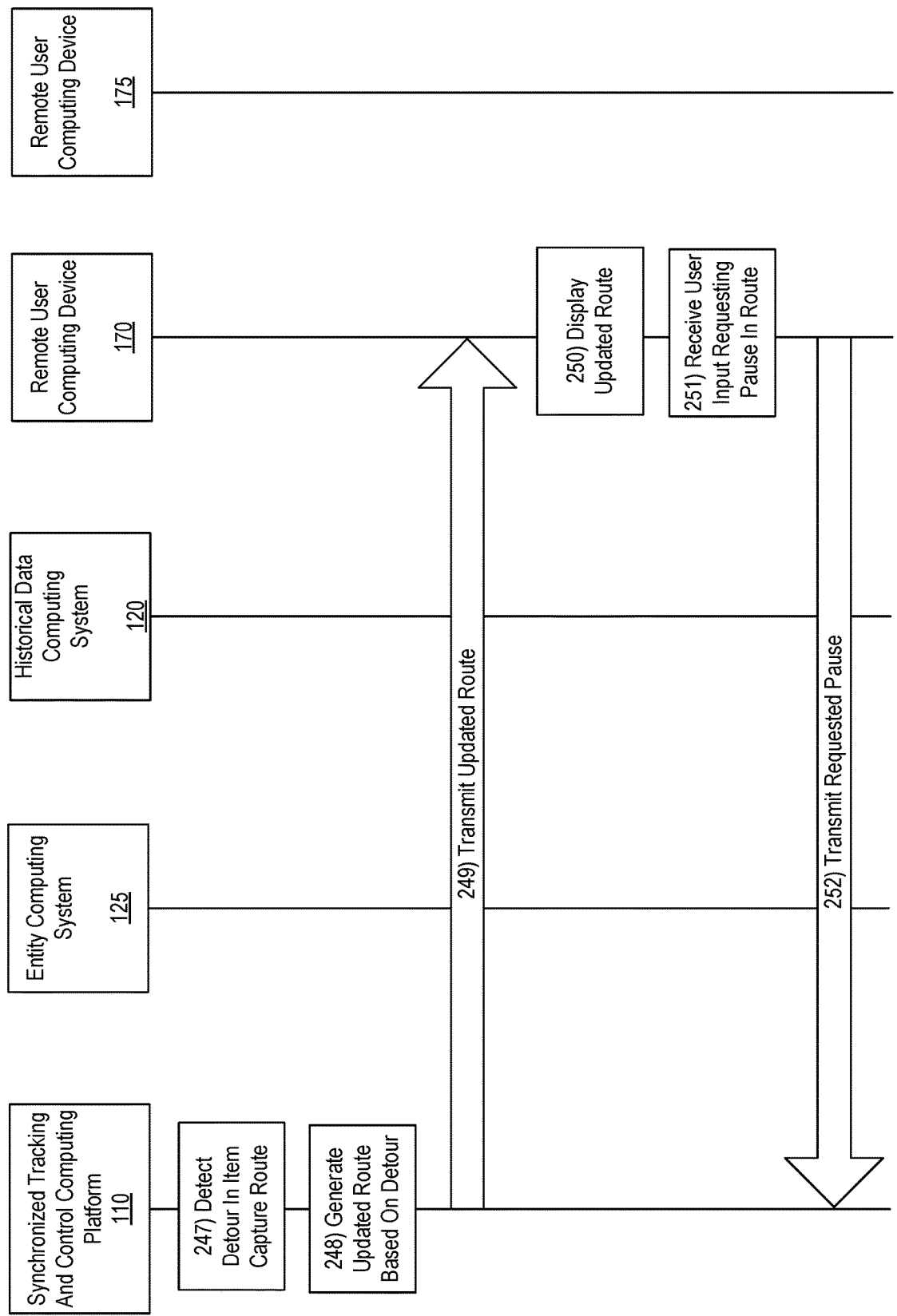

With reference to FIG. 2I, at step 247, based on the analysis of the real-time location data, a detour from the item capture route may be detected. For instance, real-time location data may, in some examples, be continuously transmitted or streamed to the synchronized tracking and control computing platform 110. The data may be analyzed and a detour from the generated item capture route may be detected.

At step 248, based on the detected detour, an updated item capture route may be generated. For instance, real-time location data may be further analyzed to identify an updated route that accounts for the detour made from the originally generated item capture route.

At step 249, the updated item capture route may be transmitted from the synchronized tracking and control computing platform 110 to the remote user computing device 170. At step 250, the updated item capture route may be received by the remote user computing device 170 and displayed by a display of the remote user computing device 170.

As discussed herein, a user may request to pause or delay completion of capturing items on a route. Accordingly, at step 251, the remote user computing device 170 may receive user input requesting a pause in the item capture route. The request may be received via a selectable option displayed along with the map or instructions associated with the route. A pause may be requested for an originally generated route, an updated route, or both.

At step 252, the requested pause may be transmitted from the remote user computing device 170 to the synchronized tracking and control computing platform 110. In some examples, the request may be transmitted via an existing communication session. In other examples, a new communication session may be initiated.

Figure 2J:
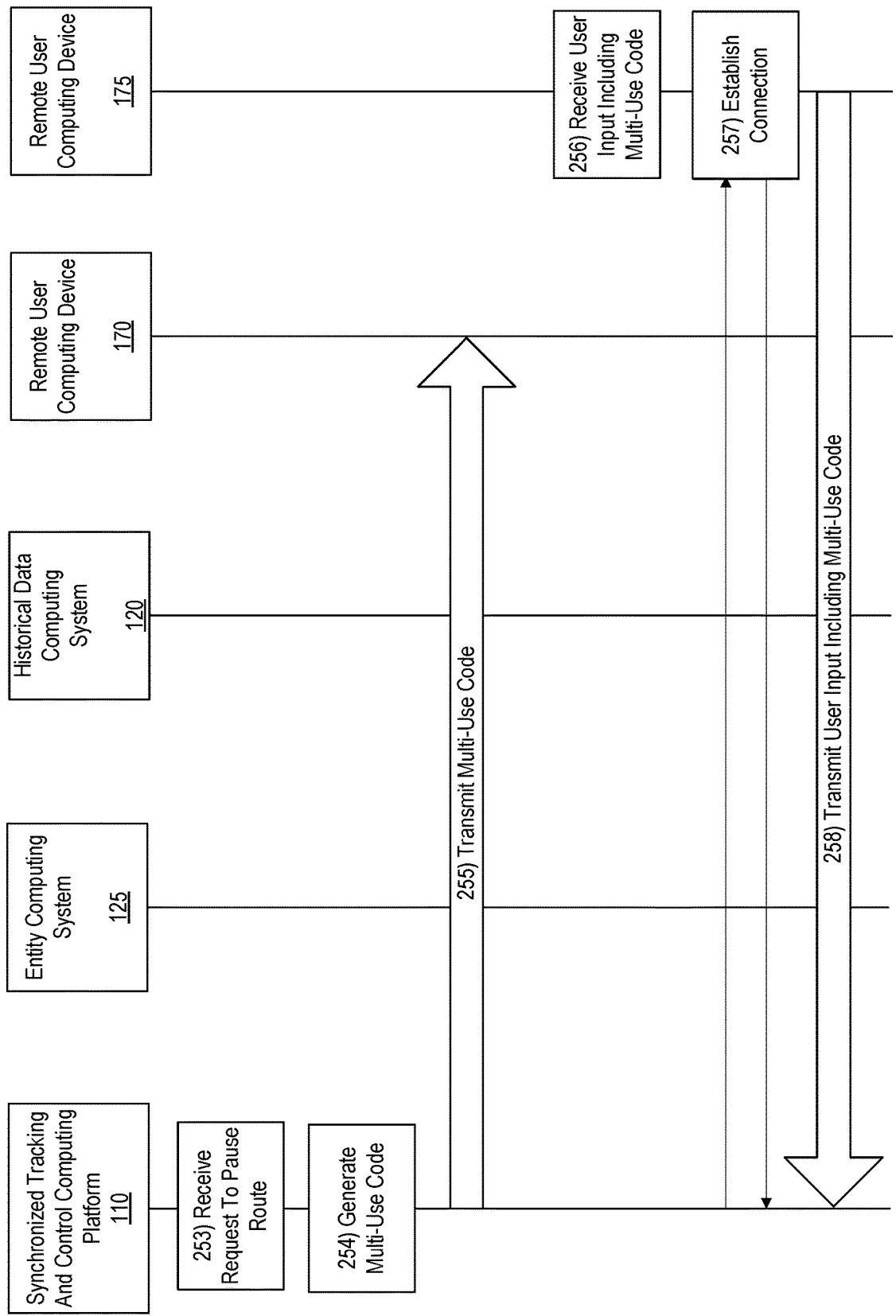
Figure 2L:
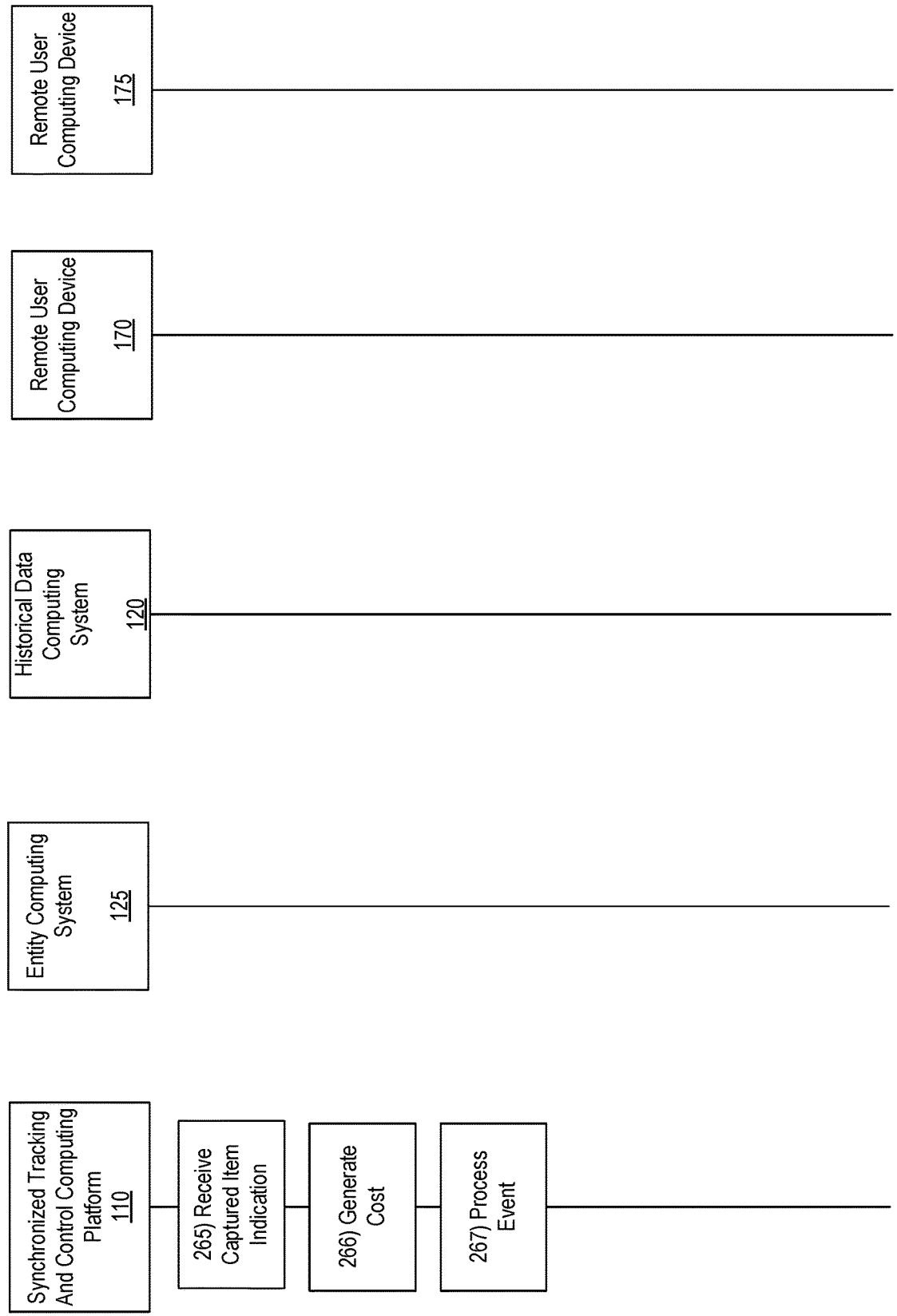

With reference to FIG. 2J, at step 253, the request to pause the item capture route may be received and analyzed by the synchronized tracking and control computing platform 110. At step 254, a multi-use code may be generated associated with the pausing. In some examples, the multi-use code may be generated, associated with the generated current item capture route, items previously captured along the route, and the like, and stored together. The multi-use code may be a unique identifier associated with the current route, items being captured, or the like. In some examples, the multi-use code may include a string of alphanumeric characters. Additionally or alternatively, activating a multi-use code may require input of additional identifying authentication information (e.g., personal identification number, password, biometric data, or the like).

At step 255, the multi-use code may be transmitted to the remote user computing device 170. In some examples, a user may elect to share the multi-use code with another registered remote user computing device, such as remote user computing device 175. Additionally or alternatively, the user may access the multi-use code via another computing device, such as remote user computing device 175 (e.g., via an application executing on both devices). Accordingly, a user may resume the item capture route by inputting the multi-use code via one or more of remote user computing devices 170, 175. This enables a user to resume if a different device is present, if the user is requesting a second user (e.g., with a registered device) to complete the route, or the like.

At step 256, user input including the multi-use code may be received by remote user computing device 175. Although in this example, the code is received via remote user computing device 175, the code may be received by any registered device associated with the user, such as remote user computing device 170, without departing from the invention.

At step 257, a connection may be established between the synchronized tracking and control computing platform 110 and the remote user computing device 175. For instance, a ninth wireless connection may be established between the synchronized tracking and control computing platform 110 and the remote user computing device 175. Upon establishing the ninth wireless connection, a communication session may be initiated between synchronized tracking and control computing platform 110 and remote user computing device 175.

At step 258, the multi-use code may be transmitted from the remote user computing device 175 to the synchronized tracking and control computing platform 110. The code may be transmitted during the communication session initiated upon establishing the ninth wireless connection.

With reference to FIG. 2K, at step 259, the multi-use code may be received by the synchronized tracking and control computing platform 110 and may be verified (e.g., additional authenticating data may be verified, device identifying data may be verified, or the like).

A step 260, a revised or current item capture route may be generated or retrieved. For instance, the item capture route stored when the pause in the route was requested may be retrieved. Additionally or alternatively, an further updated item capture list may be generated based on, for example, a current location of remote user computing device 175 (e.g., if that device is nearer to an alternate location of the entity at which the items are being captured, or the like).

At step 261, the revised or current item capture route may be transmitted from the synchronized tracking and control computing platform 110. At step 262, the revised or current item capture route may be displayed by a display of the remote user computing device 175.

Upon completion of capture of the items on the route, the synchronized tracking and control computing platform 110 may automatically process payment to purchase the items captured. For instance, as items are captured along the route, the user may indicate that they have been captured, the items may be scanned (e.g., via a remote user computing device, or the like), or the like. This indication of captured items may be generated at step 263 (e.g., after capture). Additionally or alternatively, the item capture indication may be generated as items are captured on the list.

The generated item capture indication may be transmitted from the remote user computing device 175 (or other remote user computing device if items were captured via that device) at step 264. At step 265, the captured item indication may be received by the synchronized tracking and control computing platform 110.

At step 266, a cost associated with the captured items may be generated or determined. For instance, the cost may be determined based on entity data received from the entity computing system 125.

At step 267, the event may be processed. For instance, payment for the captured items may be processed using a credit card provided by the user, by deducting funds from an account provided by the user, or the like. In some examples, a notification may be generated and transmitted to a user device indicating that the event was processed.

FIG. 3 is a flow chart illustrating one example method of implementing synchronized tracking and control functions according to one or more aspects described herein. The processes illustrated in FIG. 3 are merely some example processes and functions. The steps shown may be performed in the order shown, in a different order, more steps may be added, or one or more steps may be omitted, without departing from the invention.

At step 300, user data may be received. For instance, user data may be received from one or more user computing devices, such as remote user computing device 170, remote user computing device 175, or the like. In some examples, the user data may be received from a first user computing device and may include purchase history, internet browsing history, anticipated purchase data, and the like.

At step 302, historical data may be received. For instance, historical data may be received from historical data computing system 120 and may, in some examples, including purchase history data of the user associated with the first user computing device, user data and the like.

At step 304, a first recommendation may be generated. For instance, machine learning may be used to analyze the historical data and/or user data to generate a first recommendation for an item to be captured. The first recommendation may be transmitted to, for instance, the first user computing device for display. In some examples, the first recommendation may be transmitted via a user interface including a selectable option to accept or reject the first recommendations.

At step 306, a determination may be made as to whether the first recommendation was accepted. If not, the process may end (or a route may be generated without the product of the recommendation, as desired). If the first recommendation is accepted, at step 308, a request for entity data may be generated, transmitted to an entity computing system, and entity data may be received. As discussed herein, the entity data may include inventory data, availability data, location data, and the like.

At step 310, based on one or more of the historical data, user data, first recommendation and/or entity data, a list of items to capture and an item capture route may be generated. The list of items to capture may include at least the item of the first recommendations. The item capture route may include a route (e.g., instructions, map, or the like) of an efficient route to capture items on the list.

At step 312, the list of items to capture and item capture route may be transmitted to one or more user computing devices, such as the first user computing device.

At step 314, a request to pause the item capture list may be received. For instance, user input may be received requesting a pause in the generated route. Responsive to receiving the request to pause the route, a multi-use code may be generated at step 316. The multi-use code may be associated with the generated list of items to capture, the item capture route, and the like.

At step 318, the multi-use code may be received from a user computing device (e.g., as a request to resume the item capture route). In some examples, the multi-use code may be received from the first user computing device to which it was transmitted. Additionally or alternatively, the multi-use code may be received from a second user computing device different from the first user computing device (e.g., shared by the first user computing device).

At step 320, the multi-use code may be verified and the paused route and/or an updated route (e.g., based on a current location of the user computing device from which the multi-use code was received) may be generated and transmitted to the user computing device from which the multi-use code was received.

Figure 4:
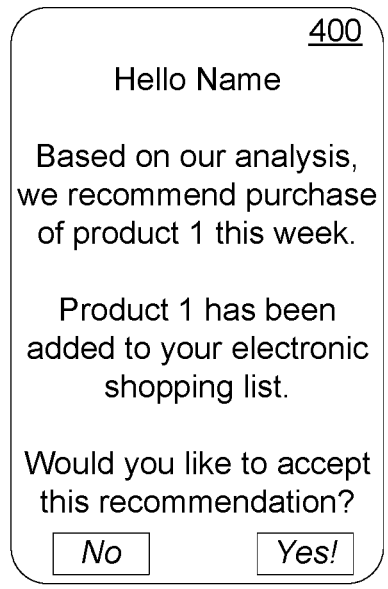
FIG. 4 illustrates one example user interface that may be generated in accordance with one or more aspects described herein.

FIG. 4 illustrates one example user interface including a first recommendation. The interface 400 includes an indication of a recommendation to purchase item 1 when shopping this week. The interface further includes selectable options to accept or reject the addition of recommended item 1 to an electronic shopping list of a user.

Figure 5:
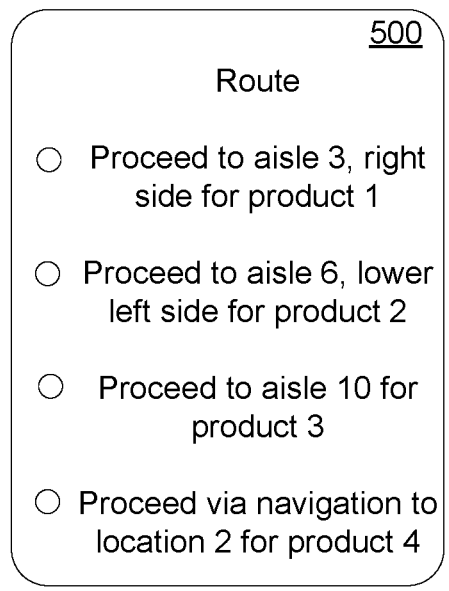
FIG. 5 illustrates another example user interface that may be generated in accordance with one or more aspects described herein.

FIG. 5 illustrates one example generated item capture route. The interface 500 includes identification of a route (e.g., step-by-step instructions) for capturing items on a list of items to be captured. In some examples, each item may include a radio button or other selectable option that may be selected when a user has captured that item. When the user is finished, he or she may transmit the indication of items captured for cost determination and payment processing.

As discussed herein, aspects described are directed to synchronously tracking and controlling events involving multiple computing systems. The arrangements described herein provide an efficient, accurate and robust analysis of user and other data to generate recommendations and or a route to capture items (e.g., based on machine learning).

For instance, as discussed herein, users may generate an electronic shopping list. In some examples, this data, as well as other user data, historical data, and the like, may be used to generate one or more recommended items for addition to the shopping list. The user may accept or reject the recommendations and a list of items to be captured, and/or a route to efficiently capture those items, may be generated.

In some examples, the recommendation may be generated based on data received from another computing device of a user. For instance, a user may browse for a product on a first user computing device (e.g., a tablet) and may create a shopping list on a second computing device (e.g., a smartphone). Browsing history data from the first user computing device may be received and analyzed to generate the recommended product that may then be added to the shopping list on the second user computing device.

In some examples, the generated list may include associated costs (e.g., based on received entity data) as well as impact on a budgeted amount for a shopping trip, item or items for purchase, or the like. The information may be updated in real-time to indicate a current status of a budget.

As discussed herein, some aspects are directed to receiving an indication of items captured and automatically processing a payment or event to transfer funds corresponding to a cost of the items. In some examples, the indication may be received via user selection of items captured (e.g., via a remote user computing device). Additionally or alternatively, a mobile device, such as remote user computing device, may dock or otherwise connect to a shopping cart and items added to a cart may be automatically flagged as captured. In still other examples, a user may scan (e.g., using a scanning or other image capture device of the remote user computing device) each item as it is transferred into a shopping card in order to provide an indication that the item has been captured.

In some examples, detection of a user computing device, such as remote user computing device 170, remote user computing device 175, or the like, at a particular location may activate or enable one or more features or functions. For instance, if a user device is detected at a particular entity, the system may automatically display the list of items for capture and/or route and may enable automatically payment or event processing.

The arrangements described herein may further aid in simplifying the overall journey of a user to obtain items on a list of items to be captured. For instance, inventory and/or availability data may be retrieved and/or updated in realtime to identify out of stock items, low availability items, and the like. In some examples, a generated item capture route may be automatically updated or revised to reflect changes due to out of stock items.

In some examples, an item capture route may include an indication of where, in a particular retail location or entity location, an item is located. For instance, a description by aisle number, shelf number or the like may be provided to the user. In some arrangements, a map may be displayed with an icon or other indicator in the location of the item along a particular aisle.

In some examples, generating one or more recommendations for a user may further include identifying and transmitting any discounts, incentives or the like, to the user. In some arrangements, a user may register with one or more entities (e.g., retail establishments, vendors, or the like) to receive incentives.

In some arrangements, the system may receive data of various different types, from different applications, or the like, in order to generate recommendations. For instance, health and/or lifestyle data may be used to generate purchase recommendations for a user. Accordingly, if a user attempts to purchase a first item, the system may flag it as not in line with one or more goals (e.g., budget, dietary restrictions, or the like) and may provide a recommended alternative.

In some examples, the system may generate notifications when non-recommended items are purchased via one or more registered devices. For instance, a parent may receive a notification when a child attempts to use his or her device (e.g., registered device) to purchase something. The parent may then approve or deny the request to purchase.

Figure 6:
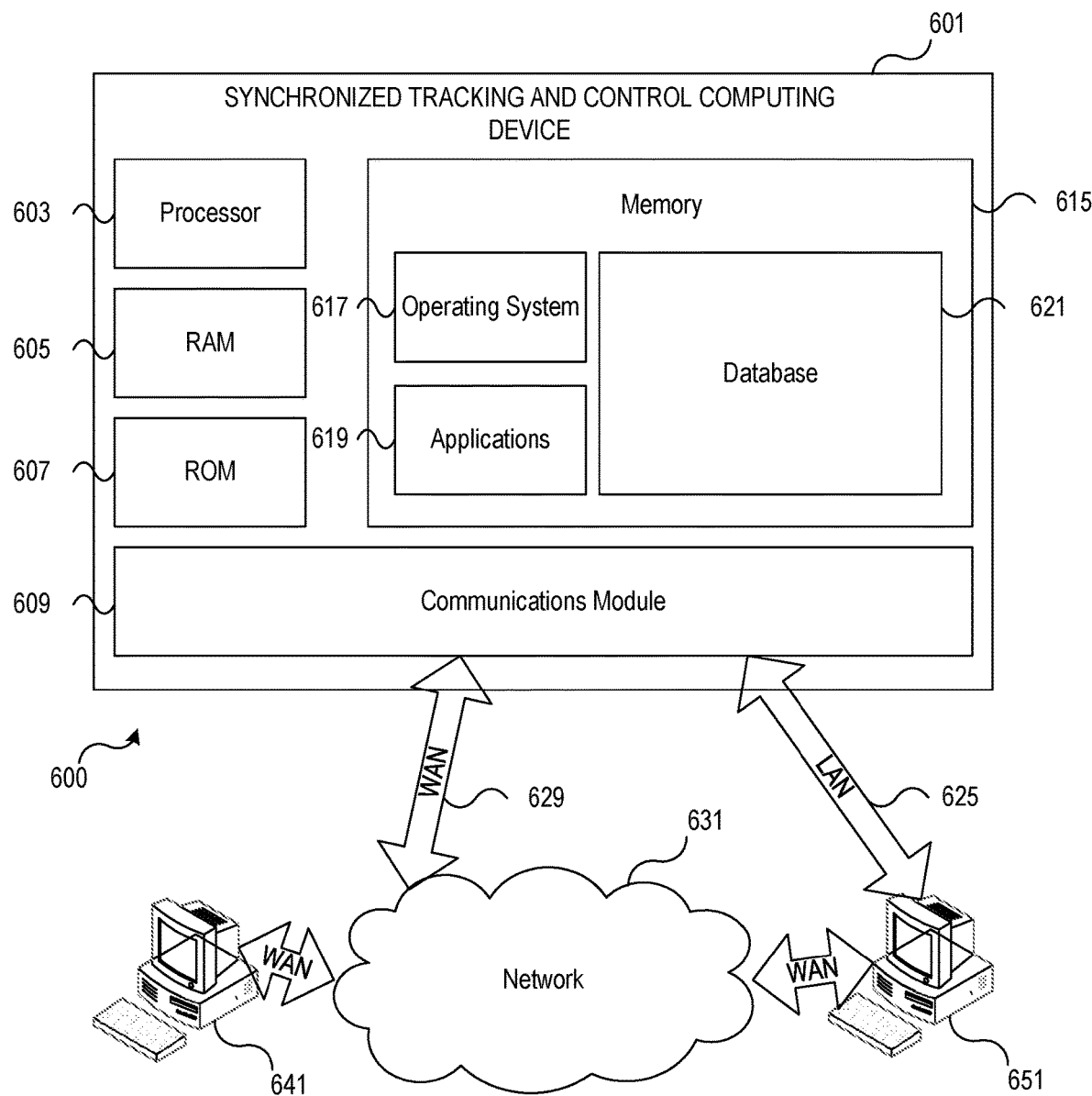
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include synchronized tracking and control computing device 601 having processor 603 for controlling overall operation of synchronized tracking and control computing device 601 and its associated components, including Random Access Memory (RAM) 605, Read-Only Memory (ROM) 607, communications module 609, and memory 615. Synchronized tracking and control computing device 601 may include a variety of computer readable media. Computer readable media may be any available media that may be accessed by synchronized tracking and control computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by synchronized tracking and control computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on synchronized tracking and control computing device 601. Such a processor may execute computer-executable instructions stored on a computer-readable medium.

Software may be stored within memory 615 and/or storage to provide instructions to processor 603 for enabling synchronized tracking and control computing device 601 to perform various functions as discussed herein. For example, memory 615 may store software used by synchronized tracking and control computing device 601, such as operating system 617, application programs 619, and associated database 621. Also, some or all of the computer executable instructions for synchronized tracking and control computing device 601 may be embodied in hardware or firmware. Although not shown, RAM 605 may include one or more applications representing the application data stored in RAM 605 while synchronized tracking and control computing device 601 is on and corresponding software applications (e.g., software tasks) are running on synchronized tracking and control computing device 601.

Communications module 609 may include a microphone, keypad, touch screen, and/or stylus through which a user of synchronized tracking and control computing device 601 may provide input, and may also include one or more of a speaker for providing audio output and a video display device for providing textual, audiovisual and/or graphical output. Computing system environment 600 may also include optical scanners (not shown).

Synchronized tracking and control computing device 601 may operate in a networked environment supporting connections to one or more remote computing devices, such as computing devices 641 and 651. Computing devices 641 and 651 may be personal computing devices or servers that include any or all of the elements described above relative to synchronized tracking and control computing device 601.

The network connections depicted in FIG. 6 may include Local Area Network (LAN) 625 and Wide Area Network (WAN) 629, as well as other networks. When used in a LAN networking environment, synchronized tracking and control computing device 601 may be connected to LAN 625 through a network interface or adapter in communications module 609. When used in a WAN networking environment, multi-synchronized tracking and control computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 7:
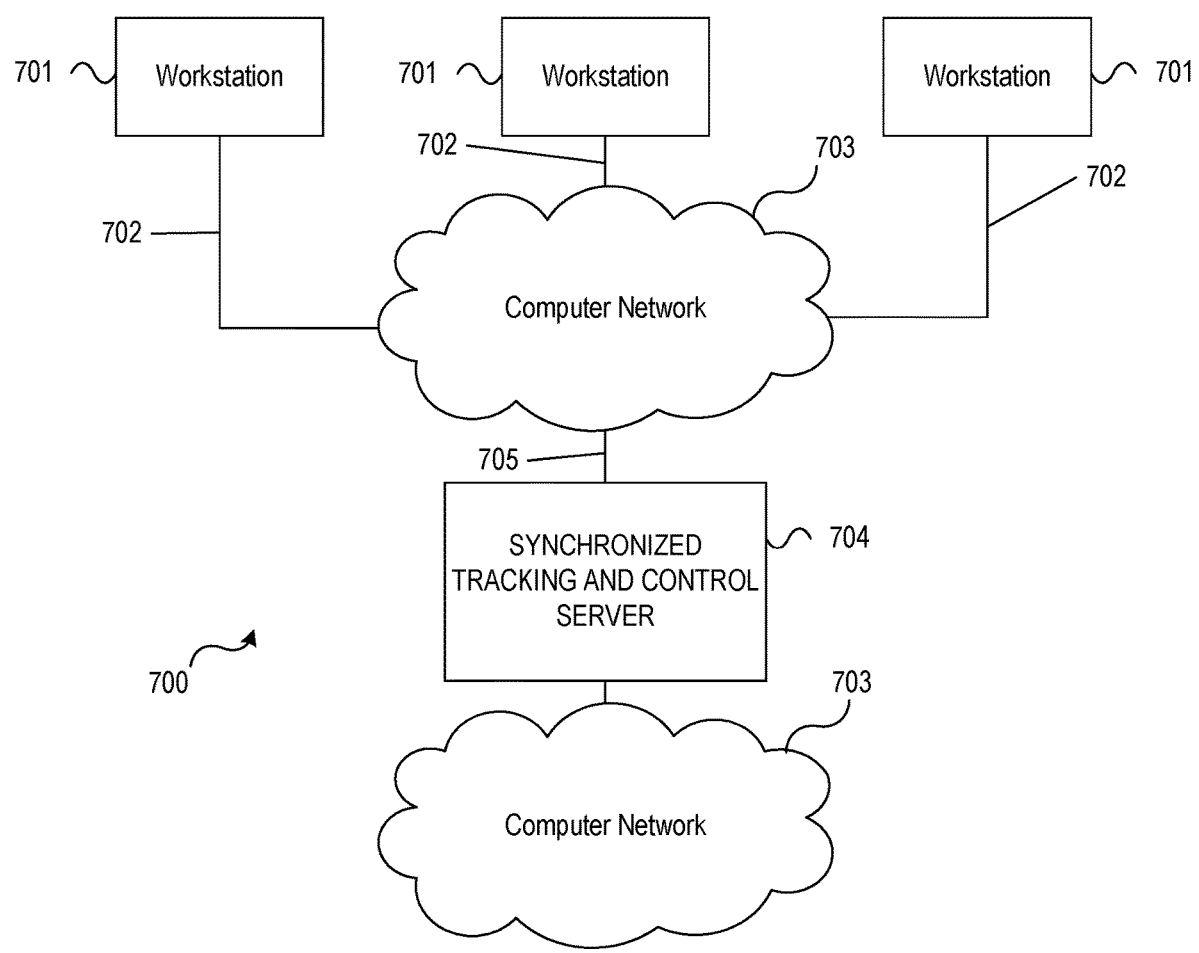
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to synchronized tracking and control server 704. In system 700, synchronized tracking and control server 704 may be a server, processor, computer, or data processing device, or combination of the same, configured to perform the functions and/or processes described herein. Server 704 may be used to receive data, generate recommendations using machine learning, generate item capture lists and routes, transmit generated lists and route, process events, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and synchronized tracking and control server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
at least one processor;

a communication interface communicatively coupled to the at least one processor; and a memory storing computer-readable instructions that, when executed by the at least one processor, cause the computing platform to:

receive, from a first user computing device of a first user, user data of the first user;

receive, from a second user computing device of the first user, historical data including purchase data;

generate, based on the historical data and the user data, and using one or more machine learning datasets, a first recommendation for a first item to capture;

transmit, to the first user computing device, the generated first recommendation;

receive, from the first user computing device, acceptance of the first recommendation;

validate, based on the acceptance, the one or more machine learning datasets;

based on the acceptance, request, from an entity computing system, entity data;

generate, based on the entity data, user data, historical data and first recommendation, and using the one or more machine learning datasets, a list of items to capture and an item capture route including instructions to capture the items, the list including at least the first item;

transmit, to the first user computing device, the generated list of items to capture and item capture route for display on the first user computing device;

receive, from an image capture device of the first user computing device, a scan of at least one item on the generated list of items to capture indicating capture of the at least one item;

receive, from the first user computing device, a request to pause the item capture route;

responsive to receiving the request to pause the item capture route, generate a multi-use code including a string of alphanumeric characters, the multi-use code associated and stored with the item capture route, the generated list of items to capture, and the captured at least one item;

activate the multi-use code, wherein activating the multi-use code includes requiring user input providing authentication data;

transmit, to the first user computing device, the multi-use code;

receive the multi-use code and authentication data;

resume the item capture route;

after resuming the item capture route, continuously receive real-time location data from the first user computing device;

analyze the continuously received real-time location data to detect a detour from the item capture route; and in response detecting the detour, generate an updated route and transmit the updated route to the first user computing device.

2. The computing platform of claim 1, further including instructions that, when executed, cause the computing platform to:

receive, from the first user computing device, location data associated with a current location of the first user computing device; and generate, further based on the current location, the item capture route.

3. The computing platform of claim 1, wherein the item capture route includes instructions to capture items on the list of items to capture within a particular retail location.

4. The computing platform of claim 3, wherein the instructions are provided via a map view.

5. The computing platform of claim 1, further including instructions that, when executed, cause the computing platform to:

receive, from a third user computing device of a second user different from the first user, the multi-use code;

receive, from the third user computing device, current location data of the third user computing device;

generate, based on the current location data of the third user computing device, an updated item capture route; and transmit, to the third user computing device, the updated item capture route.

6. The computing platform of claim 1, further including instructions that, when executed, cause the computing platform to:

determine, based on the scan of the at least one item on the generated list of items to capture indicating capture of the at least one item and the entity data, a cost associated with the at least one item captured; and automatically process a payment associated with the cost of the at least one item captured, wherein automatically processing the payment includes one of: charging a credit card of the first user an amount corresponding to the cost of the at least one item captured or deducting, from an account of the first user, the amount corresponding to the cost of the least one item captured.

7. The computing platform of claim 1, wherein the generated list of items to capture includes costs associated with each item on the list of items to capture and an indication of impact of the costs associated with each item on a budgeted amount.

8. The computing platform of claim 7, wherein the indication of impact of the costs associated with each item on the budgeted amount may be updated in real-time.

9. A method, comprising:

receiving, by a computing platform having at least a first processor and memory and from a first user computing device of a first user, user data of the first user;

receiving, by the at least a first processor and from a second user computing device of the first user, historical data including purchase data;

generating, by the at least a first processor and based on the historical data and the user data, and using one or more machine learning datasets, a first recommendation for a first item to capture;

transmitting, by the at least a first processor and to the first user computing device, the generated first recommendation;

receiving, by the at least a first processor and from the first user computing device, acceptance of the first recommendation;

validating, by the at least a first processor and based on the acceptance, the one or more machine learning datasets;

based on the acceptance, requesting, by the at least a first processor and from an entity computing system, entity data;

generating by the at least a first processor, based on the entity data, user data, historical data and first recommendation, and using the one or more machine learning datasets, a list of items to capture and an item capture route including instructions to capture the items, the list including at least the first item;

transmitting, by the at least a first processor and to the first user computing device, the generated list of items to capture and item capture route for display on the first user computing device;
receiving, by the at least a first processor and from an image capture device of the first user computing device, a scan of at least one item on the generated list of items to capture indicating capture of the at least one item;
receiving, by the at least a first processor and from the first user computing device, a request to pause the item capture route;
responsive to receiving the request to pause the item capture route, generating, by the at least a first processor, a multi-use code including a string of alphanumeric characters, the multi-use code associated and stored with the item capture route, the generated list of items to capture, and the captured at least one item;
activating, by the at least one processor, the multi-use code, wherein activating the multi-use code includes requiring user input providing authentication data;
transmitting, by the at least a first processor and to the first user computing device, the multi-use code;
receiving the multi-use code and authentication data;
resuming the item capture route;
after resuming the item capture route, continuously receiving real-time location data from the first user computing device;
analyzing the continuously received real-time location data to detect a detour from the item capture route; and
in response detecting the detour, generating an updated route and transmitting the updated route to the first user computing device.

10. The method of claim 9, further including:
receiving, by the at least a first processor and from the first user computing device, location data associated with a current location of the first user computing device; and
generating, by the at least a first processor and further based on the current location, the item capture route.

11. The method of claim 9, wherein the item capture route includes instructions to capture items on the list of items to capture within a particular retail location.

12. The method of claim 11, wherein the instructions are provided via a map view.

13. The method of claim 9, further including:
receiving, by the at least a first processor and from a third user computing device of a second user different from the first user, the multi-use code;
receiving, by the at least a first processor and from the third user computing device, current location data of the third user computing device;
generating, by the at least a first processor and based on the current location data of the third user computing device, an updated item capture route; and
transmitting, by the at least a first processor and to the third user computing device, the updated item capture route.

14. The method of claim 9, further including:
determining, by the at least a first processor and based on the scan of the at least one item on the generated list of items to capture indicating capture of the at least one item and the entity data, a cost associated with the at least one item captured; and
automatically processing, by the at least a first processor, a payment associated with the cost of the at least one item captured, wherein automatically processing the payment includes one of: charging a credit card of the first user an amount corresponding to the cost of the at least one item captured or deducting, from an account of the first user, the amount corresponding to the cost of the at least one item captured.

15. One or more non-transitory computer-readable media storing instructions that, when executed by a computing platform comprising at least one processor, memory, and a communication interface, cause the computing platform to:
receive, from a first user computing device of a first user, user data of the first user;
receive, from a second user computing device of the first user, historical data including purchase data;
generate, based on the historical data and the user data, and using one or more machine learning datasets, a first recommendation for a first item to capture;
transmit, to the first user computing device, the generated first recommendation;
receive, from the first user computing device, acceptance of the first recommendation;
validate, based on the acceptance, the one or more machine learning datasets;
based on the acceptance, request, from an entity computing system, entity data;
generate, based on the entity data, user data, historical data and first recommendation, and using the one or more machine learning datasets, a list of items to capture and an item capture route including instructions to capture the items, the list including at least the first item;
transmit, to the first user computing device, the generated list of items to capture and item capture route for display on the first user computing device;
receive, from an image capture device of the first user computing device, a scan of at least one item on the generated list of items to capture indicating capture of the at least one item;
receive, from the first user computing device, a request to pause the item capture route;
responsive to receiving the request to pause the item capture route, generate a multi-use code including a string of alphanumeric characters, the multi-use code associated and stored with the item capture route, the generated list of items to capture, and the captured at least one item;
activate the multi-use code, wherein activating the multi-use code includes requiring user input providing authentication data;
transmit, to the first user computing device, the multi-use code;
receive the multi-use code and authentication data;
resume the item capture route;
after resuming the item capture route, continuously receive real-time location data from the first user computing device;
analyze the continuously received real-time location data to detect a detour from the item capture route; and
in response detecting the detour, generate an updated route and transmit the updated route to the first user computing device.

16. The one or more non-transitory computer-readable media of claim 15, further including instructions that, when executed, cause the computing platform to:
receive, from the first user computing device, location data associated with a current location of the first user computing device; and
generate, further based on the current location, the item capture route.

17. The one or more non-transitory computer-readable media of claim 15, wherein the item capture route includes instructions to capture items on the list of items to capture within a particular retail location.

18. The one or more non-transitory computer-readable media of claim 17, wherein the instructions are provided via a map view.

19. The one or more non-transitory computer-readable media of claim 15, further including instructions that, when executed, cause the computing platform to:
receive, from a third user computing device of a second user different from the first user, the multi-use code;
receive, from the third user computing device, current location data of the third user computing device;
generate, based on the current location data of the third user computing device, an updated item capture route; and
transmit, to the third user computing device, the updated item capture route.

20. The one or more non-transitory computer-readable media of claim 15, further including instructions that, when executed, cause the computing platform to:
determine, based on the scan of the at least one item on the generated list of items to capture indicating capture of the at least one item and the entity data, a cost associated with the at least one item captured; and
automatically process a payment associated with the cost of the at least one item captured, wherein automatically processing the payment includes one of: charging a credit card of the first user an amount corresponding to the cost of the at least one item captured or deducting, from an account of the first user, the amount corresponding to the cost of the least one item captured.

* * * * *